United States Patent [19]

Kubota et al.

[11] Patent Number: 5,467,945
[45] Date of Patent: Nov. 21, 1995

[54] APPARATUS FOR IMPROVED BLOCK CONTROL OF TRAIN OPERATION

[75] Inventors: Kiyoto Kubota, Mishima; Hiroto Takeuchi, Tokyo; Shinichiro Kato, Shizuoka, all of Japan

[73] Assignee: Central Japan Railway Company, Japan

[21] Appl. No.: 206,761

[22] Filed: Mar. 7, 1994

[30] Foreign Application Priority Data

Apr. 8, 1993 [JP] Japan ................... 5-082088

[51] Int. Cl.$^6$ .................................................. B61L 21/04
[52] U.S. Cl. ..................... 246/26; 246/24; 246/187 B
[58] Field of Search ..................... 104/290–294, 104/295, 298, 299, 300; 246/20, 24, 25, 26, 28 R, 187 R, 187 B

[56] References Cited

U.S. PATENT DOCUMENTS

| 4,348,618 | 9/1982 | Nakamura et al. | 104/290 |
| 5,125,347 | 6/1992 | Takahashi et al. | 104/298 |

FOREIGN PATENT DOCUMENTS 4-185208  2/1992  Japan .

Primary Examiner—Robert J. Oberleitner
Assistant Examiner—S. Joseph Morano
Attorney, Agent, or Firm—Davis, Bujold & Streck

[57] ABSTRACT

The invention relates to an improved block control for controlling a train safely and efficiently along a railway system. The apparatus includes a mechanism for designating a train route, a mechanism for assigning a feeder section along the designated train route to a desired substation, a mechanism for locking an assigned feeder section to a desired substation and for preventing unlocking of that assignment until predetermined conditions are met, a mechanism for designating a traveling direction of the train along the assigned feeder section, and a mechanism for controlling operation of the train along a designated control route. The invention also relates to a mechanism for enlarging a control route, a mechanism for unlocking the assigned feeder sections and substations, a mechanism for checking a determined control route, a mechanism for changing the borders of a feeder section, and a mechanism for selectively communicating received data to the correct substation to facilitate control of the train. The invention also relates to a method concerning the same.

21 Claims, 23 Drawing Sheets

ASSIGNMENT

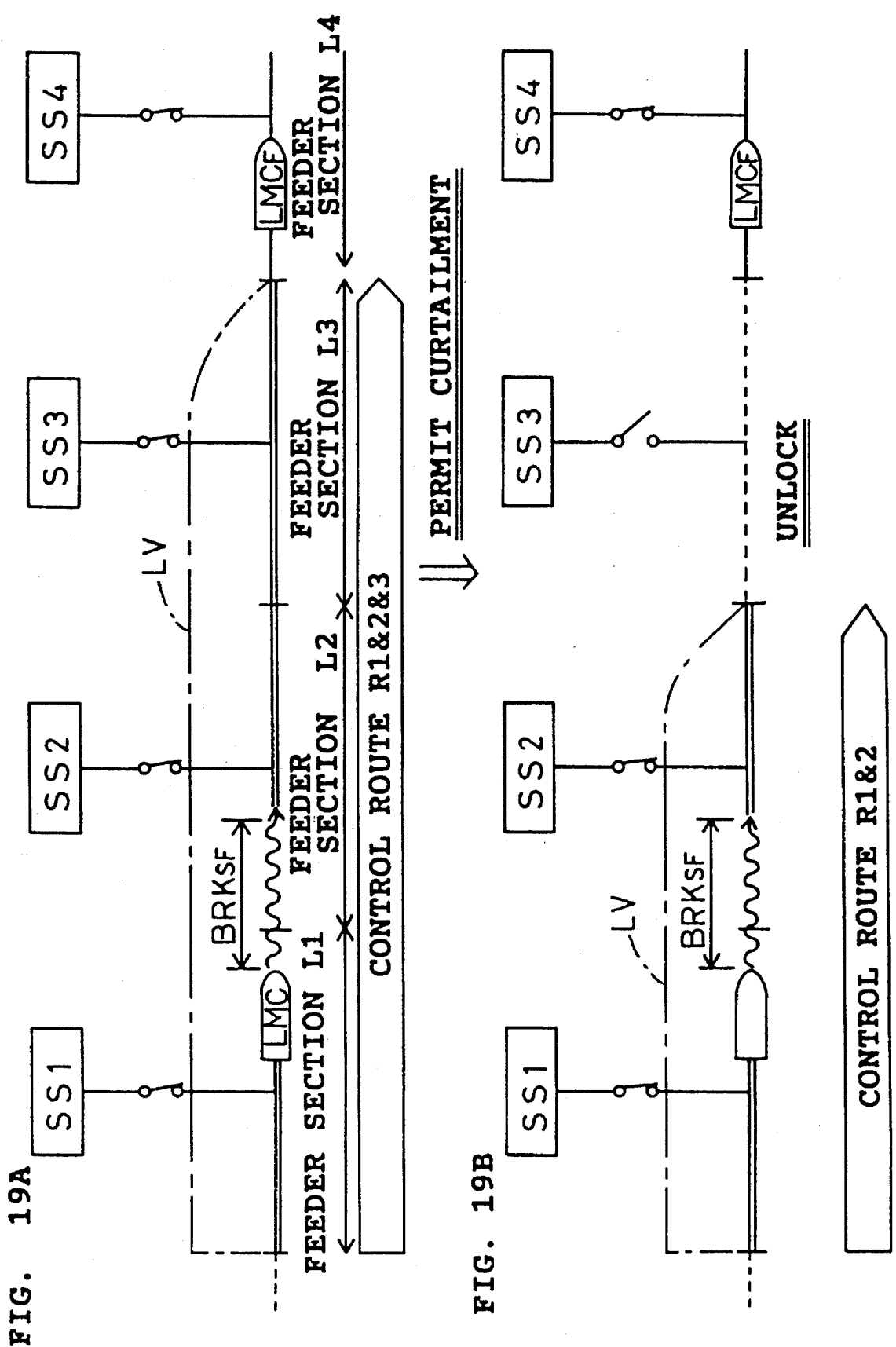

APPARATUS FOR IMPROVED BLOCK CONTROL OF TRAIN OPERATION

FIELD OF THE INVENTION

This invention relates to an improved block control of train operation. More specifically, this invention relates to an apparatus for attaining a safe and efficient block control of train operation for a railway system in which power is supplied to a limited section of track where power is required, as in linear motor railway systems.

BACKGROUND OF THE INVENTION

"Block Control" is conventionally used to control train operation in most railway systems. In order to prevent collisions between trains running with a minimal distance therebetween, block control allows only one train to exist within a single block section of a railway line at a time, with a following train "blocked out" and prohibited from entering the block section. Security in train operation is thus attained by the block control system.

Known in common railway systems are two types of block control, one is a "fixed block" and the other is a "flexible block". In fixed block control, the automatic train control ATC is performed according only to the position of a preceding train. In flexible block control, the velocity of a subsequent train is also taken into consideration. In either of the block controls, the position of the preceding train is detected by a track circuit connected to the train and the railroads. A track circuit is provided for each block section which is predetermined according to a braking distance and an idle running distance of a subsequent train. In fixed block control, the borders of the block sections are fixed and cannot be changed. In flexible block control, wherein a block section may consist of a plurality of smaller sections integrally connected, the length of one block section can be varied by connecting or disconnecting the smaller sections to or from a block section, but the length of the smaller sections forming the block section are constant.

Additionally, a magnetic levitation railway system of on-ground primary propulsive type, hereinafter referred to as an on-ground linear railway system, requires another factor, in addition to the above mentioned factors such as braking distance, for performing the block control. The additional factor is the requirement that only a single train is allowed in a feeder section controlled by a substation. Therefore, in an on-ground linear railway system, the length of one block section for the purpose of performing the block control is determined as corresponding to one feeder section controlled by one substation.

Accordingly, in order to achieve shorter block sections while utilizing block control in the on-ground linear railway system, a substantial number of substations corresponding to each block section are required, reducing the cost-efficiency. As a result, the block sections for the on-ground linear railway system have been relatively long, and a reduction of cost-efficiency must be disregarded at stations where a number of railroad lines gather.

As a solution to this problem, a new method of controlling train operation was recently proposed whereby a plurality of sectional switching devices are provided on feeder lines to vary the feeder section length in an attempt to improve cost efficiency. Japanese Unexamined Patent Publication No. 4-185208 discloses such an apparatus which is utilized in performing the block control according to the newly proposed method.

Further, as a method for attaining an efficient on-ground linear railway system with existing substations, it was also proposed to change the feeder sections connected to each substation. For instance, only a single substation is provided for a plurality of feeder sections. Among the plurality of feeder sections, a feeder section having a train therein to be driven is designated from a control center and connected to the substation.

However, the alteration of the feeder sectioning and the switching of the connection between the substation and the feeder sections give rise to the following problems.

In an on-ground linear railway system, power is not supplied to all the feeder sections on a regular basis, in contrast to the contact wires of a common railway system. Instead, power is supplied only to the feeder section where power is required, and the acceleration and deceleration of a train is controlled by the amount of supplied power. Therefore, when there is no power supplied to the feeder section, the velocity of the train in the feeder section cannot be controlled. In other words, when a train enters a feeder section that is not controlled by a substation, the train can not be accelerated or decelerated. Thus, the method reveals a drawback in terms of security.

Further, the mentioned method of Japanese Unexamined Patent Publication No. 4-185208 neglects the need to look to the condition of a preceding or subsequent train in altering the feeder sections. As a result, when a feeder section is lengthened forward, a preceding train may be included in the same feeder section as the train in question, and the principle of "one train in one block section" is not maintained. If a feeder section is lengthened backward, the following train running behind the train in question may be included in the same feeder section, and will be suddenly halted.

SUMMARY OF THE INVENTION

Wherefore, an object of the present invention is to provide an apparatus for attaining a safe and efficient block control of train operation under a system in which power is supplied to a limited track section, such as in an on-ground linear railway systems.

In order to attain the stated object, in a first aspect of the invention, the apparatus according to the present invention is used in a railway system including:

a railroad structured having a plurality of feeder sections, and a plurality of substations provided along the railroad, wherein each of the plurality of substations is assigned one feeder section and each substation respectively controls the power to be supplied to its corresponding feeder section, thereby controlling the operation of a train running along the feeder section. The apparatus includes:

route designation means for designating a course to be taken by the train;

assigning means for assigning a feeder section corresponding to the designated course to each substation such that the feeder section and the substation are electrically controllable in relation with each other;

substation locking means for locking the assigned feeder section to the substation such that cancellation of the assignment of the feeder section to the substation is prohibited until predetermined conditions are attained;

direction designation means for designating a moving direction of the train to the feeder section locked to the substation; and operation control means for controlling operation of the train according to a control route, wherein the control route is determined as a feeder section that is locked to a substation and specified with the train's advancing direction.

When controlling a running train, the apparatus thus determines a control route to perform its operation. The control route corresponds to "a route" in conventional railway systems and is established when a feeder section is assigned and locked to a substation and given an instruction concerning a train's advancing direction. Also, the concept of the "locking" according to the present invention is similar to the "locking" in the conventional railway systems in which a signal or switching device is electrically or mechanically not changeable. Therefore, the "locked" feeder section does not allow any alteration unless it is first "unlocked".

In contrast, the feeder section designated as a course is not determined to be a control route until the feeder section is assigned to a substation. This is because the substation locking means does not lock a feeder section which has not been assigned to a substation by the assigning means, the direction designation means does not designate a direction to a feeder section which has not been locked, nor does the operational control means operate a train along a feeder section, which has not been locked or provided with a direction as a control route in controlling the train operation.

The concept of the "control route" in this invention is partly analogous to the "route" in the conventional railway system in that it defines the route to be taken by the train. However, the concept of the "control route" is novel and unique to this invention in that it also means that the route is ready to have automatic train control performed thereon.

Accordingly, among a plurality of feeder sections, those feeder sections which are established as part of the control route are the feeder sections on which train control can be effected. A train cannot enter the feeder sections which are not established as the control route.

As a result, each of the feeder sections need not be fixedly assigned to a specific substation. Instead, the assignment of the feeder sections to substation can be varied, and thereby the number of substations can be minimized. An efficient control of train operation is thus achieved.

According to a second aspect of the invention, the apparatus further includes linkage locking means for linking and locking a plurality of control routes lying in series with one another as one control route. During the control of train operation, each substation for each individual control route linked together and making up the whole control route cooperates with one another.

By utilizing the apparatus, a longer control route is obtained by linking a series of smaller individual control routes. A train traveling from one individual control route to another control route can be smoothly controlled. Since each feeder section included in the control route is assigned and locked to a substation, control failure can not be caused in any of the feeder sections. Moreover, since the smaller control routes are locked to each other, inadvertent disconnection of the control routes does not caused.

According to a third aspect of the invention, the apparatus includes:

passage determination means for determining whether or not the train has passed any of the feeder section included in the linked control routes;

automatic linkage unlocking means for, when the passage determination means determines that the train has passed a feeder section, automatically unlocking the feeder section locked by the linkage locking means;

automatic substation unlocking means for unlocking the substation locked to the feeder section which had its linkage unlocked by the automatic linkage unlocking means; and assignment cancellation means, included in the assigning means, for canceling the assignment to the substation of the feeder section which was unlocked from the substation.

By utilizing the apparatus, the feeder sections which are included in the linked control routes have their linkage unlocked, in accordance with the progress of the train, one after another from a rear end of the control route by the automatic linkage unlocking means. Moreover, by the automatic substation unlocking means and the assignment cancellation means, the substation assigned to the unlocked feeder section is automatically released. The feeder section, released from the assignment to the substation, is thus able to become a control route for another train, and the released substation is enabled to control other feeder sections. Consequently, the spacing between two trains is minimized, thereby attaining a more efficient train operation.

According to a fourth aspect of the invention, the apparatus further includes route checking means and route change prohibiting means, both included in the route designation means.

The route checking means determines, when the route designated by the route designation means will result in alteration of the current control route, whether or not the alteration of the control route is prohibited by predetermined rules.

The route change prohibiting means prohibits the alteration of the control route when the route checking means determines that the alteration of the control route is prohibited by predetermined rules.

During operation, when performing the alteration of the control route, e.g. forward elongation of the control route in accordance with the progress of the train, it is first determined, by the route checking means, whether or not the alteration of the control route is prohibited by the predetermined rules. If prohibited, the alteration of the control route is not effected.

There may be a variety of rules which prohibit the alteration of the control route, the rules take into account various factors, such as the relative position and the state of the other train, i.e. halted or running, or whether or not the substation for the feeder section to be added to the control route is already assigned another feeder section, etc.

According to a fifth aspect of the invention, the apparatus includes:

border changing means for changing borders between feeder sections;

border checking means for determining whether or not the change of a border to be effected by the border changing means is prohibited by predetermined rules; and border change prohibiting means for prohibiting the border changing means from performing the change of border when it is determined by the border checking means that the change of border is prohibited by the predetermined rules.

When the apparatus is used in a railway system in which the borders of the feeder sections are made variable, the change of a border is effected on condition that the security of the train in relation to another train will be maintained. Therefore, by utilizing this apparatus, the method of Japanese Unexamined Patent Publication No. 4-185208 for changing the border of a feeder section can be attained not only efficiently but also safely during train control.

According to a sixth aspect of the invention, the apparatus further includes:

a plurality of data receiving means, provided along the railroad, for receiving data from the train traveling on the railroad; and selective communication means for 'selectively communicating data from the train, as data to be referred to in effecting the control of the train operation, only to the corresponding substation which is assigned the feeder section having the data receiving means which received the data from the train.

During the control of train operation utilizing the invention, the data received at the data receiving means is selectively fed only to the substation that is assigned to the feeder section where the data is derived. Otherwise, since the substation is not permanently assigned a particular feeder section and the border of the feeder sections is variable, the substation would be supplied with irrelevant data concerning another train running outside the feeder section that the substation is assigned. Erroneous control of a train caused by the substation referring to an irrelevant data is prevented by using the apparatus. For instance, a train under the control of a substation may be inadvertently accelerated when the substation receives irrelevant data concerning another train, which is decelerating and is controlled by another substation. Such an erroneous control is prevented in the apparatus according to the invention since the data is fed to the correct substation.

BRIEF DESCRIPTION OF THE DRAWINGS

An embodiment of the present invention is explained hereunder by way of example, referring to the drawings, although it is understood that other embodiments are within the scope of the present invention, in which:

FIGS. 19A and 19B are illustrations to explain the curtailment of the control route performed by the embodiment;

DETAILED DESCRIPTION OF THE PREFERRED EMBODIMENTS

Figure 1:
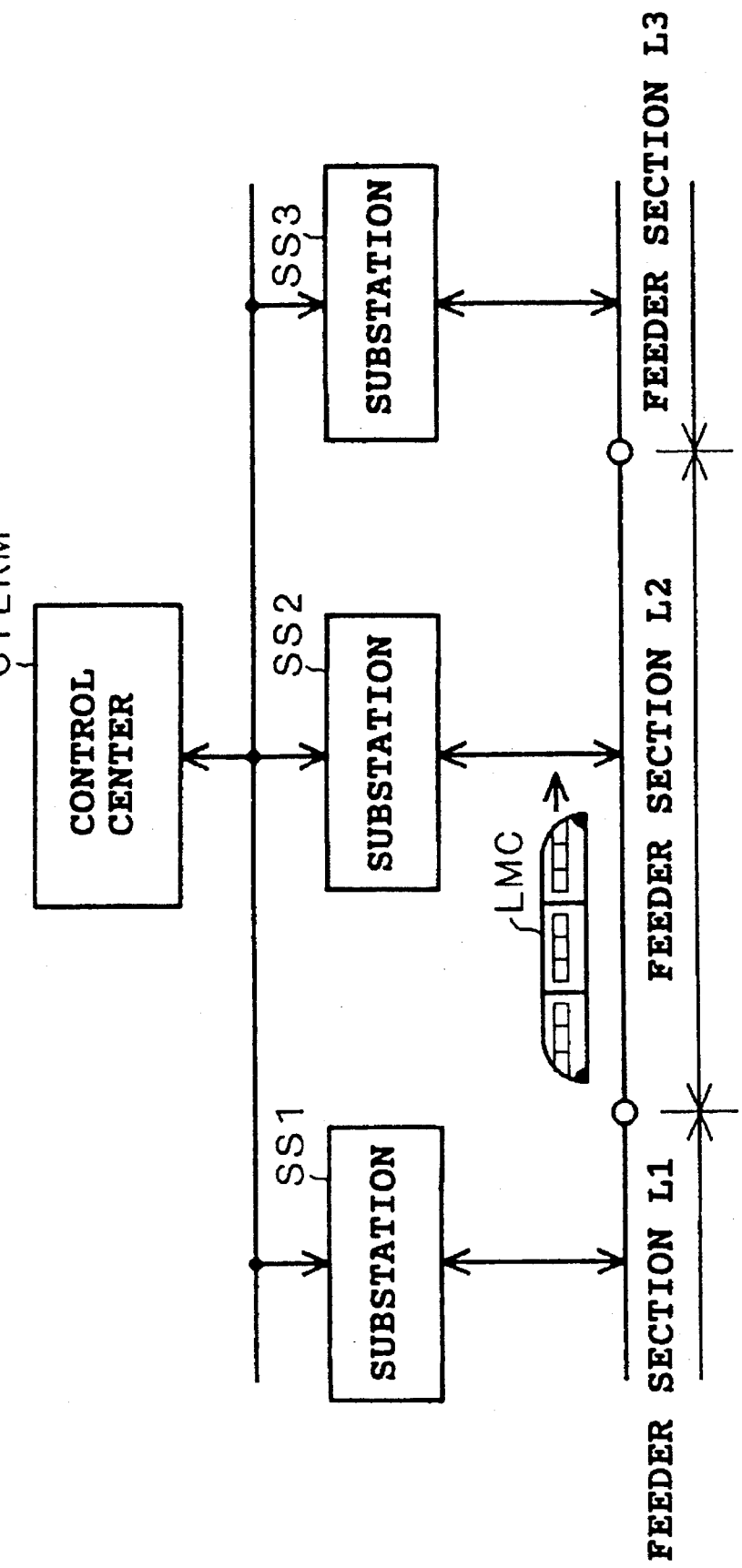
FIG. 1 is an illustration of the railway system of the embodiment.

An embodiment of the present invention is described hereunder referring to the drawings although it is understood that other embodiments are within the scope of the present invention.

The following description is provided on the premise that trains may run on a railroad in both travel directions, such as on the single-track railroad or when an accident has happened on a double-track railroad and the train running thereon toward the site must be reversed back to any nearby station.

As shown in FIG. 1, substations SS1, SS2, SS3 - - - are provided for feeder sections L1, L2, L3 - - -, respectively, in an on-ground primary linear motor system. The substations SS are supplied with a given train operation condition from a control center CTLRM which includes a large computer system.

Figure 2:
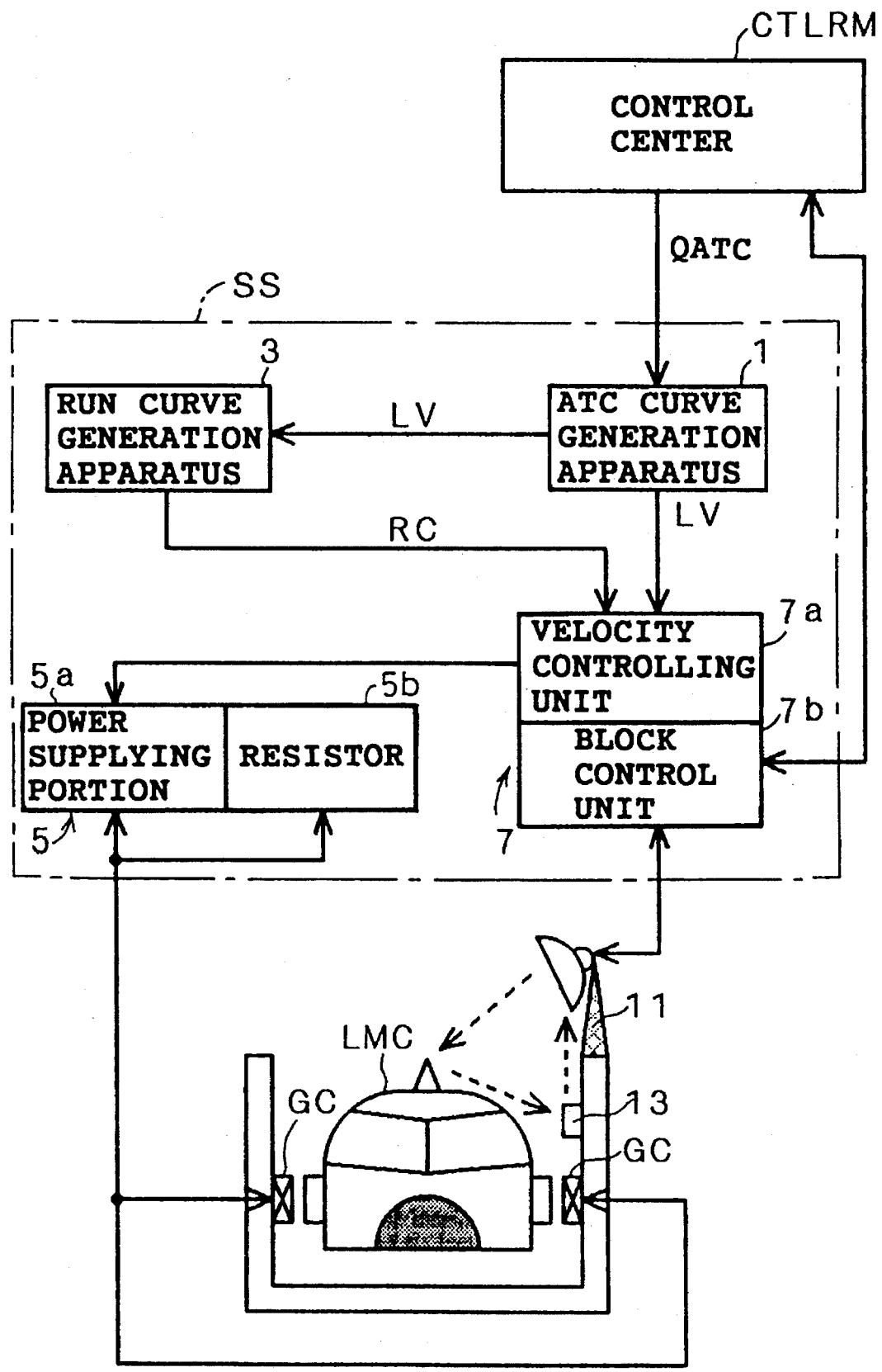
FIG. 2 is a block diagram illustrating the main structure of the system of the embodiment.

Turning to FIG. 2, each of the substations SS is provided with an ATC (automatic train control) curve generation apparatus 1 to generate an ATC curve LV. According to automatic train control, ATC, a condition QATC is specified from the control center CTLRM. The substation SS is also provided with a run curve generation apparatus 3 to generate a run curve RC according to the generated ATC curve LV. The run curve RC is employed for controlling the velocity of the train LMC in relation to its position. The substation SS is further provided with a power supply device 5 for supplying power to ground coils GC, and a control computer 7 for controlling the power supplied to the ground coils GC according to the run curve RC. When an ATC condition QATC is not specified from the control center CTLRM, a predetermined maximum velocity permitted for the specific feeder section is adopted as an ATC condition.

The power supply device 5 has a power supplying portion 5a to feed power to the ground coils GC for driving a train. The power supply device 5 also includes a resistor 5b to consume the electromotive force on the ground coils GC for attaining regenerative braking which will be explained later.

The control computer 7 includes a velocity controlling unit 7a to control the power Supply device 5. The velocity of the train is controlled by adjusting the power supply output of the power supply device 5, and the velocity is regulated, in accordance with the run curve RC, with respect to the changing position of the train. The "velocity control" mentioned hereinafter is understood as a velocity control according to position. The computer 7 also includes a block control unit 7b which effects block control according to various data sent to and from the control center CTLRM.

In addition to the propulsion ground coils GC, the railroad is also provided with ground coils, not shown in that figure, for levitation of a train. The substations SS are connected only to the propulsion ground coils GC for driving the train, and not to the ground coils for levitation. When a train LMC runs at a velocity of 100 km/h or higher, the ground coils for levitation and a superconducting magnet equipped on the train LMC cooperate and, through electromagnetic induction, form a magnetic field which levitates the train LMC.

The ground coils GC provide propulsive force for the train LMC according to the value of the power supplied from the substation SS, thereby enabling acceleration or deceleration of the train LMC. There are a variety of ways to perform deceleration. One is regenerative braking caused by terminating the power supply while the train is moving and returning the power, which has been generated in the ground coils GC through electromagnetic induction, to the power source at the substation SS. If a swift deceleration is required, the ground coils GC are short-circuited, thereby consuming the power of the ground coils GC. Further, when a more urgent deceleration is required, the aforementioned resistor 5b at the substation SS is caused to consume most of the power returning from the ground coils GC. When a deceleration is required, one of these methods is selected according to the circumstances.

Figure 3:
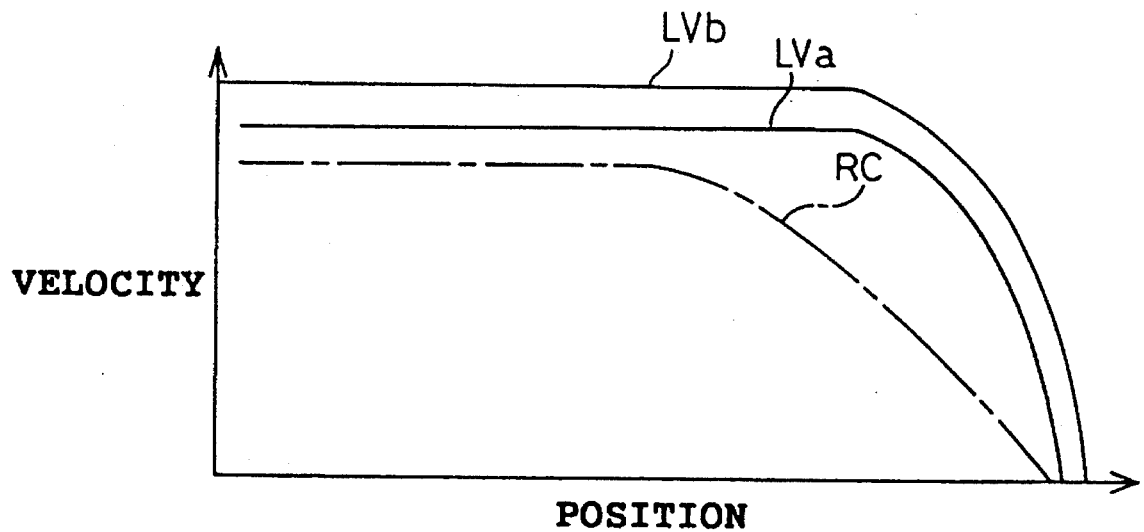
FIG. 3 is a graph showing the relationship between the ATC curve and the run curve generated by the embodiment.

As shown in FIG. 3, both the ATC curve LV generated by the ATC curve generation apparatus 1 and the run curve RC generated by the run curve generation apparatus 3 are curves plotted from the position and the velocity. Also shown in that figure, there are two kinds of ATC curves LV. The lower ATC curve LVa specifies a condition under which the deceleration is caused by the aforementioned short-circuit of the ground coils GC or by the consumption of the power by the resistor 5b. The upper ATC curve LVb specifies the condition under which an urgent deceleration using an emergency brake system 20 is effected, which will be described later in detail; the brake system is equipped on the train LMC. The run curve RC is generated so as to be lower than these two ATC curves LVa and LVb. When the velocity of the train LMC exceeds the run curve RC, one of the aforementioned manners of deceleration is effected. As long as the velocity of the train LMC is controlled in relation to the position, the velocity of the train LMC is maintained below the ATC curves LV, without activating the ATC braking system. On the other hand, if the ATC condition is altered or the control of the velocity fails for some reason, the velocity of the train LMC may exceed the ATC curve LV, thus activating the ATC braking system.

Each substation SS is connected to a corresponding repeater station 11 that is also provided for each feeder section along the railway line. The repeater station 11 relays the control signals of the train, e.g. instructs activation of the brake system equipped on the train LMC, transmitted from the control computer 7 at the substation SS. The repeater station 11 is connected to a detector 13. When the train LMC enters the section to which the detector 13 is assigned, the detector 13 continually monitors the velocity V and the position P of the train LMC every few milliseconds. The signals, received by the detector 13, are sent from the repeater station 11 to the control computer 7 of the substation SS.

Figure 4:
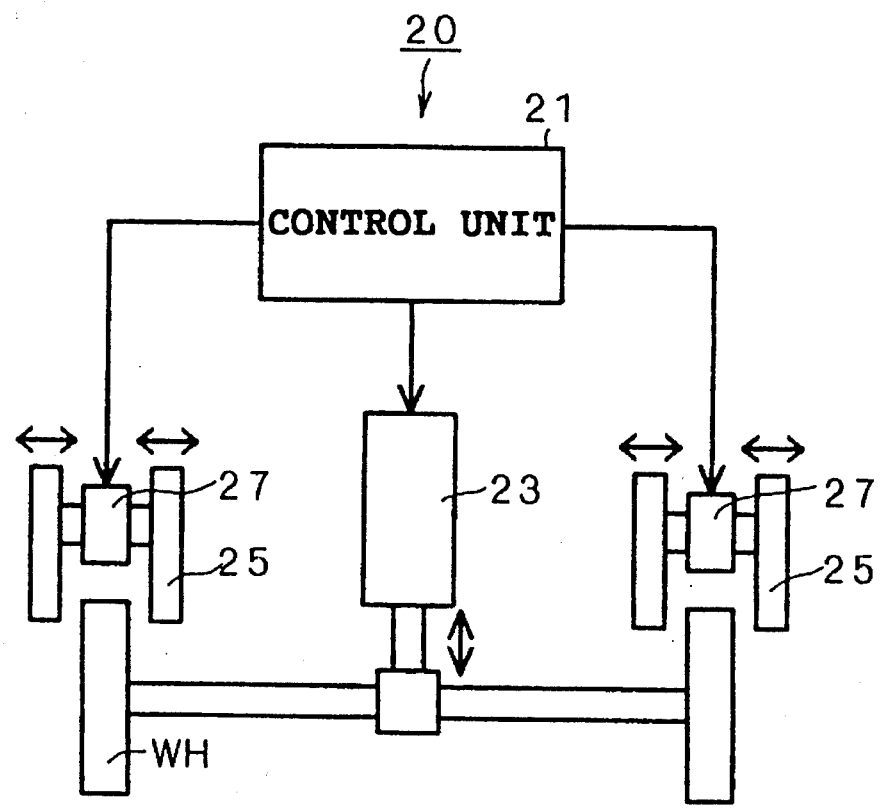
FIG. 4 is an illustration schematically showing the brake system equipped on a train of the embodiment.

As shown in FIG. 4, the above-mentioned emergency brake system 20 has a control unit 21, a wheel elevator 23 and a brake actuator 27 which actuates the disc brakes 25 mounted adjacent the wheels WH.

When an urgent deceleration is required, the substation SS instructs the train LMC to perform urgent deceleration. In response, the control unit 21 of the emergency brake system 20 on the train LMC activates the wheel elevator 23 to lower the wheels WH such that the train LMC is supported by the wheels WH on the rail. Then, the substation SS, while maintaining its connection to the feeder section, cuts off the power. As a result, the train LMC itself becomes a magnet traveling through a coil, and an electromotive force is generated by the coil. Thereby, the ground coils GC and the substation SS are connected via the resistor 5b, or the ground coils GC are short-circuited therebetween. Accordingly, the electromotive force generated by the ground coils GC is consumed either by the resistor 5b or the short-circuited ground coils GC. The train LMC is thus quickly decelerated.

If a still more urgent deceleration is required, such as when the velocity of the train LMC exceeds the upper ATC curve LVb of FIG. 3, the substation SS instructs the train LMC to urgently halt. The emergency brake system 20 then activates the wheel elevator 23 to cause the train LMC to be supported by the lowered wheels WH on the rail, and, furthermore, activates the brake actuator 27 to attain a halt caused mechanically by the disc brakes 25. At the same time, the power supply from the substation SS is terminated. An urgent halt of the train LMC is thus performed. Since the connection of the substation SS is maintained while the power is cut off, the power consumption for both the ground coils GC and the resistor 5b can be exerted to halt the train LMC.

Figure 5:
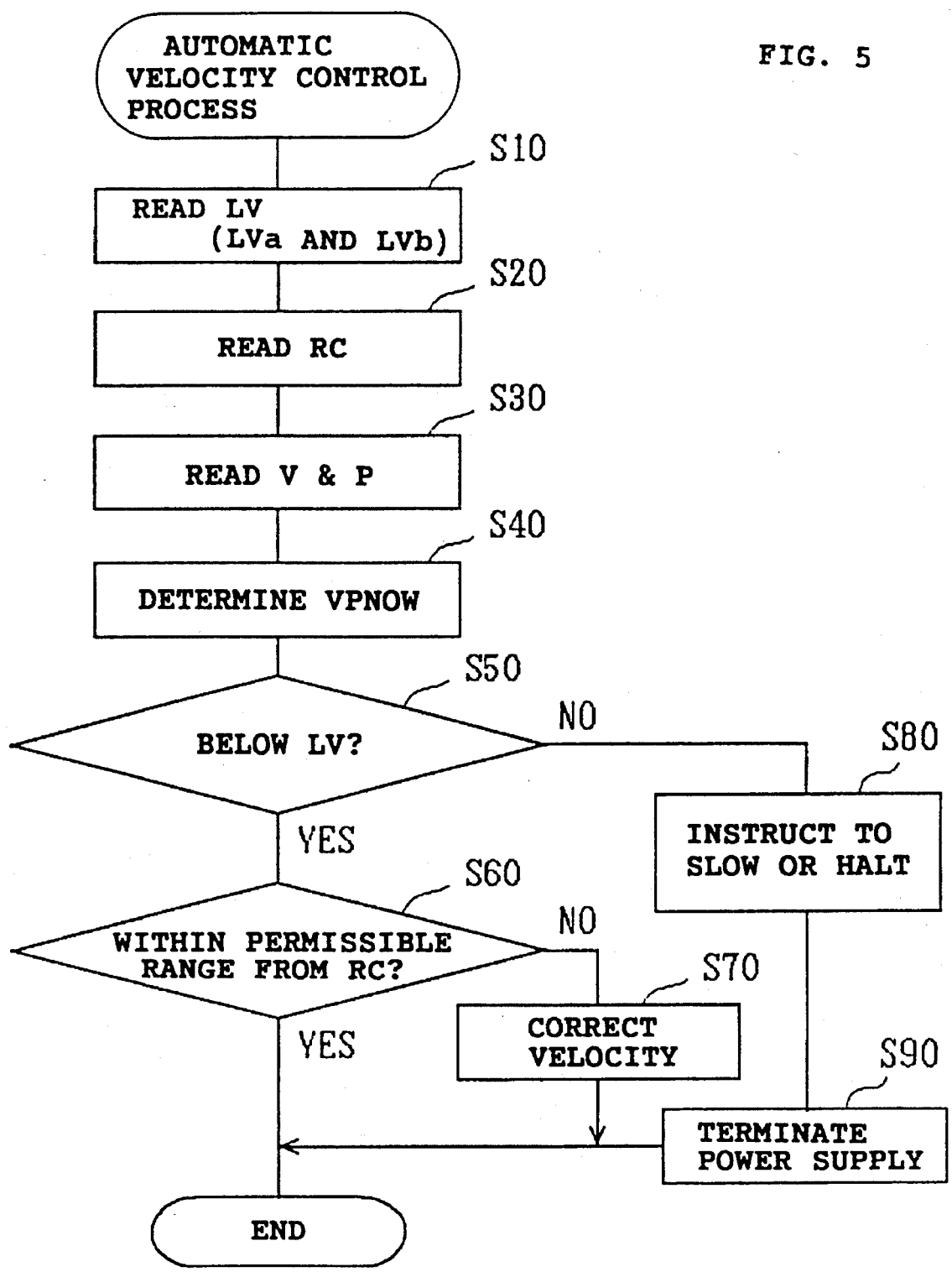
FIG. 5 is a flowchart of an automatic velocity control process performed by the embodiment.

The instruction to activate the emergency brake system 20 is issued as a result of the following process, shown in FIG. 5, at the control computer 7 of the substation SS.

The control computer 7 first reads both the ATC curves LVa and LVb generated by the ATC curve generation apparatus 1, step S10. Next, the control computer 7 also reads the run curve RC generated by the run curve generation apparatus 3, step S20. Subsequently, the velocity V and the position P of the train LMC are read via the repeater station 11, step S30. According to the read velocity V and position P, the current velocity versus position relation VPNOW is then determined, step S40.

It is next examined, step S50, whether or not the determined current velocity versus position relation VPNOW is below the ATC curve LV. If "YES" is determined at the step S50, it is next examined, step S60, whether or not the current velocity versus position relation VPNOW is within the permissible range from the run curve RC. If "YES" is determined at the step S60, the instant process ends. On the other hand, if "NO" is determined at the step S60, the velocity V is shifted by a feed back control such that the velocity V comes within the permissible range of the run curve RC, step S70. The velocity of the train LMC is thus controlled.

If "NO" is determined at the step S50, an urgent deceleration or halt is performed, at step S80, depending on the degree of the difference of the velocity of the train LMC from the ATC curve LV, and the power supply is cut off, step S90. In response to the instruction to perform the urgent deceleration or halt, the emergency brake system 20 on the train LMC is activated to lower the wheels WH. Then, the train is decelerated or halted either electrically or mechanically in the above described manner.

When electrically causing the deceleration, it is required that the substation SS remains connected to the corresponding feeder section even though connection to the power supply therebetween is terminated. This is because the electromotive force of the ground coils GC caused by movement of the train LMC must be consumed by the resistor 5b or absorbed by the short-circuited ground coils GC.

In the instant embodiment (FIG. 6), a plurality of sectional switching devices OS are provided along a feeder line L, as shown by numerals of 301, 112, 212. The interval between the sectional switching devices OS is devised so as to attain an efficient train operation, with various factors being considered such as headway of the train operation and the location of the substations SS and the stations. A switching control device OSC is also provided between the substations SS for controlling opening or closure of each sectional switching device OS.

Figure 6:
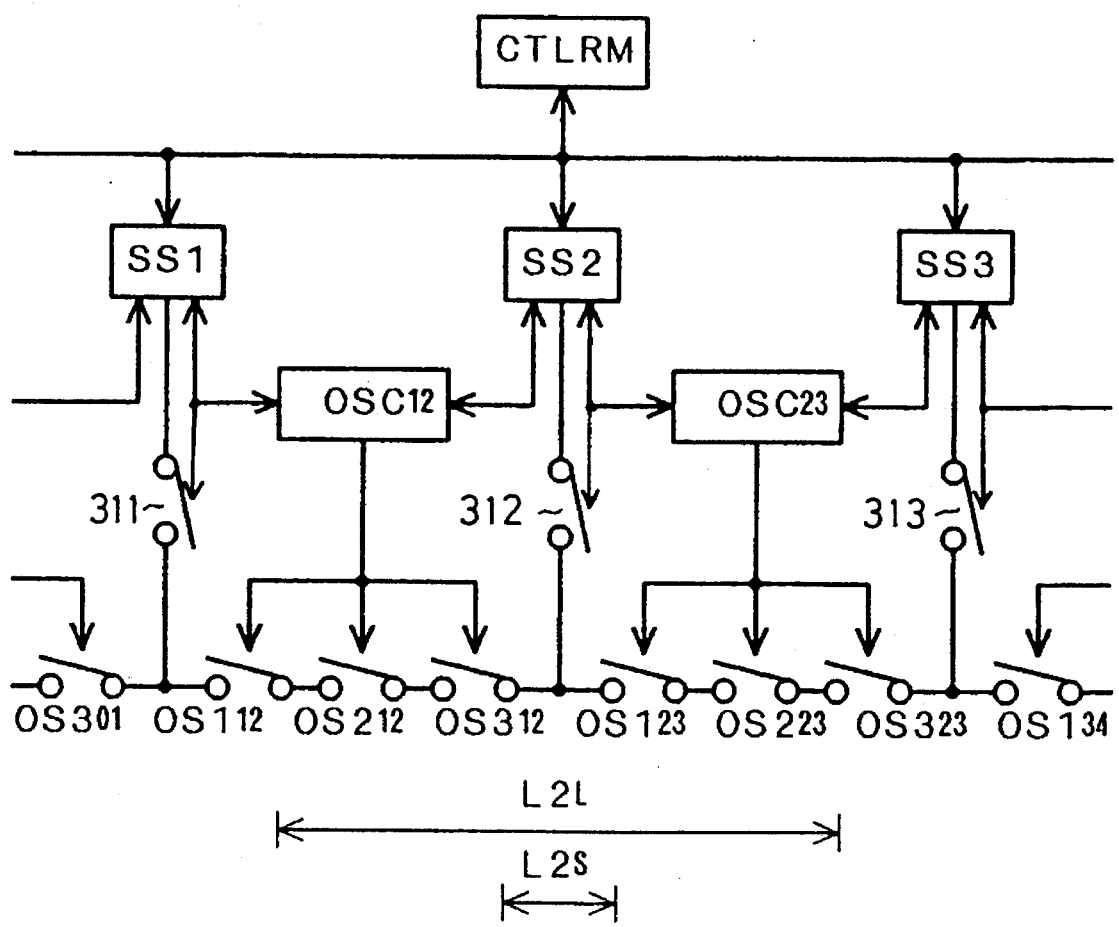
FIG. 6 is a block diagram schematically showing how the borders between feeder sections are changed by the embodiment.

For instance, the feeder section L2, controlled by the substation SS2 at the center of FIG. 6, can be elongated to L2L or shortened to L2S by opening or closing the sectional switching devices OS having numerals of 112 through 323.

The switching control devices OSC are connected to block control unit 7b of the substations SS. According to the instructions from the block control unit 7b, the sectional switching devices OS are controlled to be opened or closed, and an indication of whether the each sectional switching device OS is opened or closed is fed back to the block control unit 7b of the corresponding substation SS. Each aforementioned detector 13 is provided with each of the sectional switching devices OS.

Figure 7:
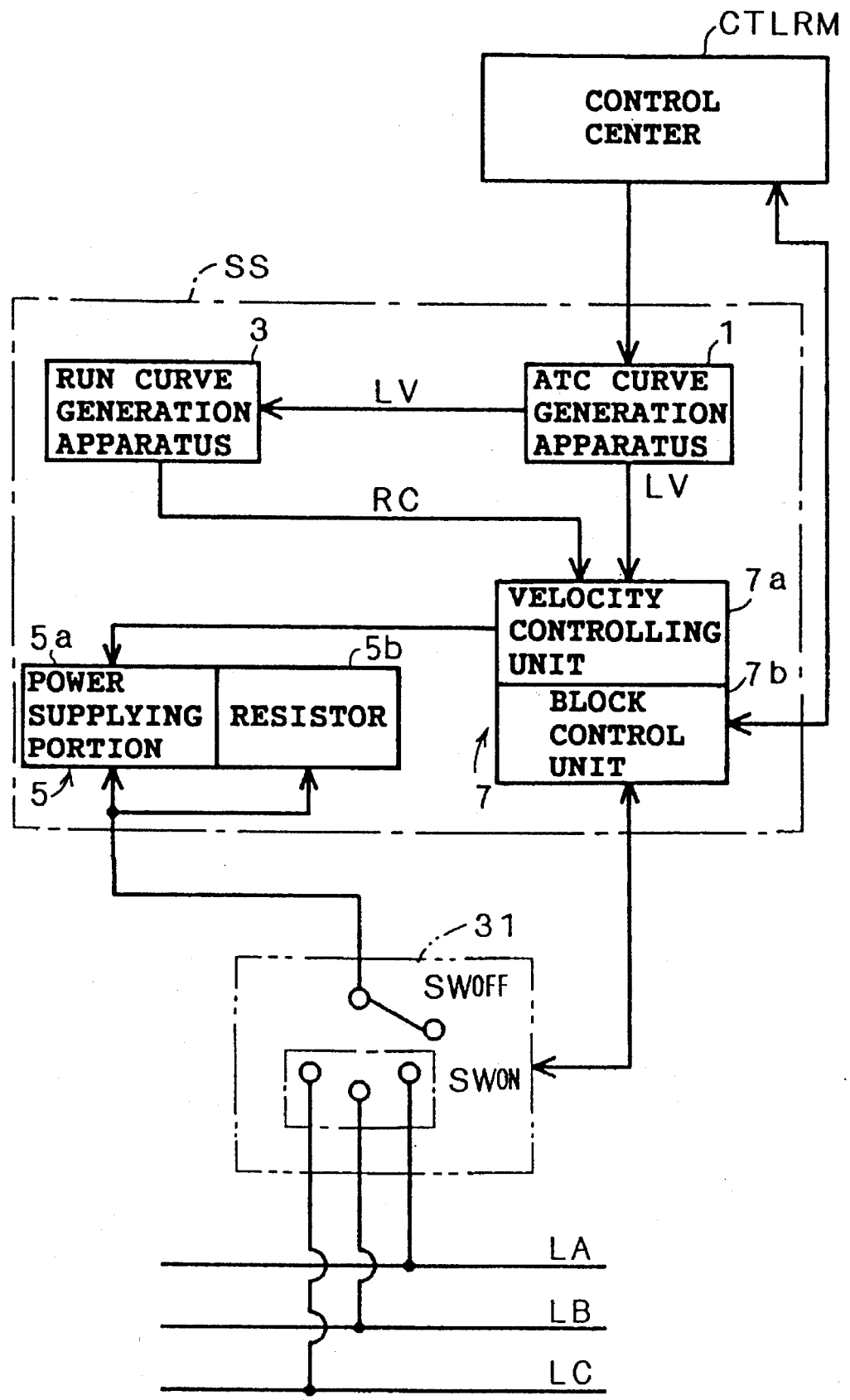
FIG. 7 is a block diagram schematically showing the connection between the substation and each feeder section.

In the instant embodiment, a plurality of feeder sections LA, LB, LC, etc, are made connectable to a single substation SS, as shown in FIG. 7. Such a substation SS is at a station, for example, and provided with a switching device 31 to' selectively supply power to one of the plurality of the feeder sections LA, LB, LC, etc. Thereby assigning one of the feeder sections LA, LB, LC etc. to the substitution SS. As long as the switching device 31 is set in a standby position SWOFF, the substation SS is not connected to any of the feeder sections LA, LB, LC, etc. When set to an enabled position SWON, the substation SS is enabled to control the power supply to one of the feeder sections LA, LB, LC, etc. The switching device 31 is connected to and controlled by the block control unit 7b of the substation SS. Therefore, the feeder section, when connected by the switching device 31, is enabled to control the train operation.

Consequently, the border of the each feeder section L can be varied by the sectional switching device OS, and the substations SS are enabled to be selectively connected to one of the plurality of feeder sections LA, LB, LC, etc.

In the instant embodiment, as shown in FIG. 6, the substations SS1, SS2 and SS3 are provided with switching devices 311, 312 and 313 regardless of the fact that they need only be connected to a single feeder section.

Since the border of the feeder sections are variable by using the sectional switching device OS, so is the length of a block section. Therefore, the block section can be curtailed, for instance, such that a following train can proceed forward and enter a section where the train otherwise should have been blocked out and halted. Therefore, the number of the substations SS to be provided along the railroads can be minimized.

Further, additional substations SS are not required even at a station having a plurality of railroad lines in parallel. An efficient train operation is thus achieved without raising the cost.

Figure 8:
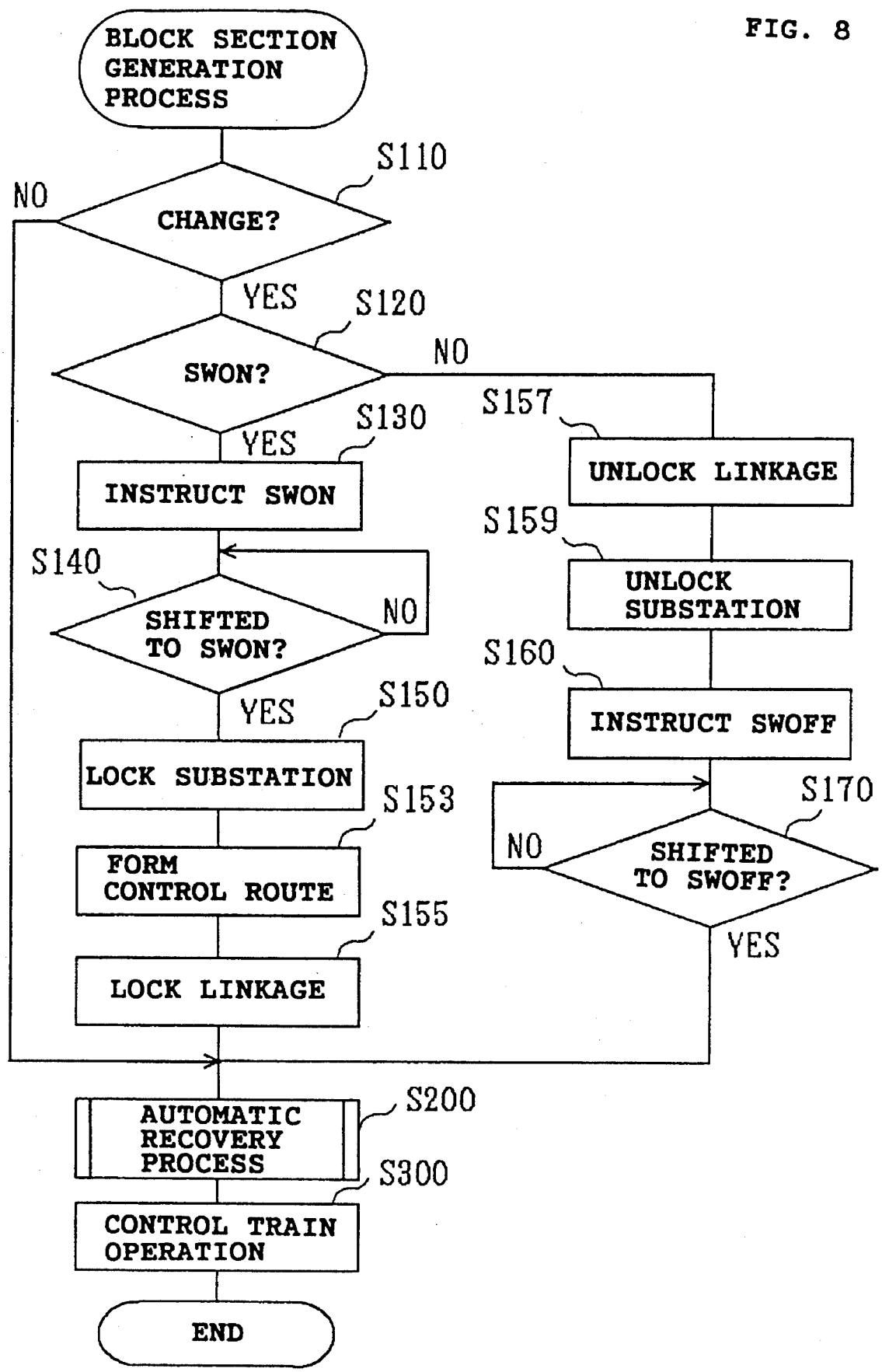
FIG. 8 is a flowchart of the process performed by the embodiment to form a control route and a closed block section.

While endowed with the above mentioned virtue, however, the arrangement as explained above has the following problem: Since the substations SS are not permanently connected to specific feeder sections, a train may enter the section where train operation is uncontrollable, or a following train may be inadvertently halted as a result of a change in borders. Accordingly, the process steps shown in FIG. 8 have the following process for relieving this problem.

At the control center CTLRM, it is constantly examined whether the connection of the switching device 31 needs to be changed according to the changing state of train operation. Specifically, it is examined, for example, if it is time to start a train remaining idle at a feeder section or if the connection of the substation SS should be changed from a halted train and allocated to another train which is moving and therefore requiring control. At a first step S110 of the process of FIG. 8, it is determined by the block control unit 7b of the substation SS whether or not the control center CTLRM is informed of such a change of the state of train operation. If "YES" is determined at the step S110, it is next examined whether, as a result of the change of the state, the switching device 31 is to have its connection shifted from the standby position SWOFF to the enabled position SWON, step S120. If "YES" is determined at the step S120, the switching device 31 is instructed to shift its connection to the enabled position SWON, in step S130. When it is subsequently determined at step S140 that the connection has been shifted, "substation locking" is performed, in step S150, with respect to the corresponding feeder section such that the feeder section cannot be unlocked from the substation SS until a predetermined requirement is fulfilled. Further, a direction is specified for the feeder section having a substation SS locked, thereby determining a control route for the train, in step S153. If the newly determined control route is for taking over the control of the train currently running in another control route, "linkage locking" is effected, in step S155, between those control routes for attaining a continuous control of train operation.

Alternatively, if "NO" is determined at the step S120, i.e. the connection is to be switched from the enabled position SWON to the standby position SWOFF, linkage unlocking" is first performed, in step S157, thereby separating one control route from another control route. Subsequently, "substation unlocking" is performed, in step S159, such that the substation SS can be released from the feeder section. Consequently, the switching device 31 is instructed to shift its connection from the enabled position SWON to the standby position SWOFF, in step S160, thereby releasing the substation SS from the feeder section. When it is determined at next step S170 that the connection has been shifted, the flow chart proceeds to the next step in the automatic recovery process.

After following both paths of the "substation locking" and

Figure 9:
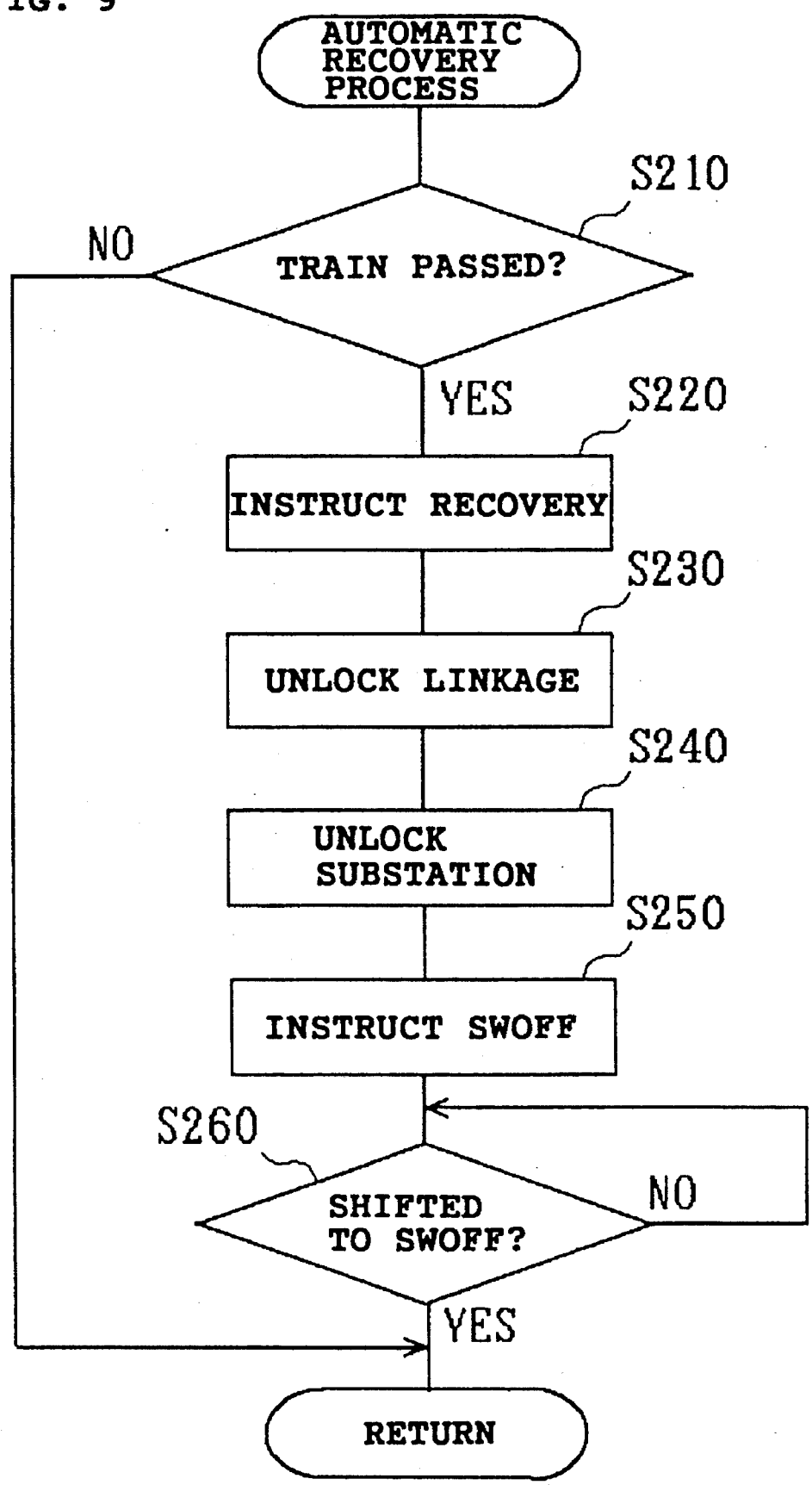
FIG. 9 is a flowchart of the automatic recovery process included in the process shown in FIG. 8.

"linkage locking", and "linkage unlocking" and "substation unlocking", an automatic recovery process shown in detail in FIG. 9 is performed, in step S200, according to the velocity V and the position P sent from the repeater station 11.

As a first step of the automatic recovery process, it is determined whether or not there is any feeder section, among those making up the control route, that the train has passed, in step S210. If there is any such feeder section, "recovery" is instructed, i.e. the connection to the feeder section is shifted to the standby position SWOFF, in step S220. Then, "linkage unlocking" and "substation unlocking" are performed, in steps S230 and S240. Consequently, the switching device 31 is instructed to shift its connection from the enabled position SWON to the standby position SWOFF, in step S250, thereby canceling the assignment of the feeder section, that the train has passed, to the substation. When the connection has been shifted to the standby position SWOFF, step S260, the flow returns back to the main routine shown in FIG. 8.

When all the steps of "substation locking", "linkage locking", or "linkage unlocking" "substation unlocking", and the following "automatic recovery" are finished, further train operation control is effected for a renewed control route, in step S300. The train operation control includes both the velocity control performed by the velocity controlling unit 7a and the block control effected by the block control unit 7b in cooperation with other substations SS.

When the control route is made up of a plurality of feeder sections, the feeder section at the end of the control route is always where the train is located. Accordingly, with respect to a following train, the block control is effected based on the feeder section at the end of the control route. On the other hand, when another train running in the opposite direction is headed toward the control route, the block control is effected based on the entire control route. This is because all of the feeder sections making up the control route have their linkage locked.

The velocity of the train running in the control route is controlled in relation to the position according to the run curve RC by adjusting the power supplied from the power supply device 5. The run curve RC, as previously described, is generated by the run curve generation apparatus 3 such that the run curve RC is below the ATC curve LV generated by the ATC curve generation apparatus 1.

If, returning back to the process at step S110, "NO" is determined at that step, the flow goes directly to step S200, skipping the process at step S120 et seq.

The concept of the "control route", "locking" and "unlocking" will be more clearly described hereinafter with reference to FIGS. 10A, 10B, 10C through 13A, 13B.

FIGS. 10A, 10B, 10C and 11A, 11B, 11C show how a train LMC is started in a feeder section and halted at the end of the feeder section.

Figure 10A:
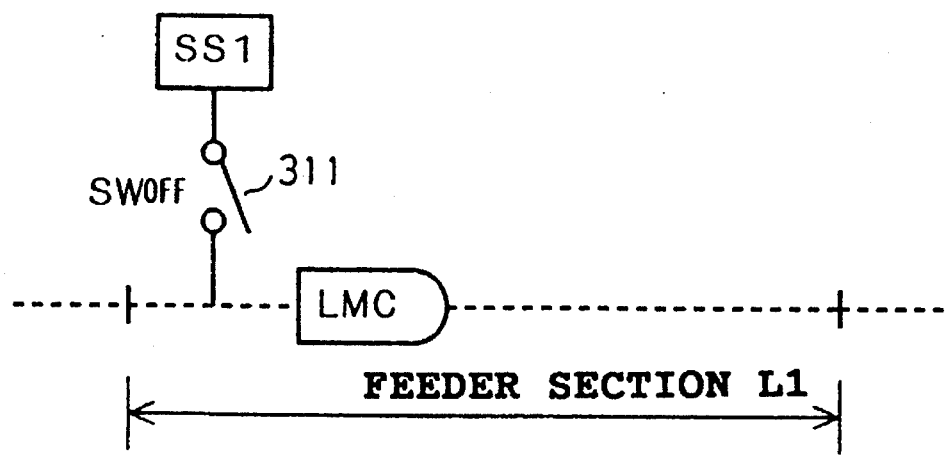
FIGS. 10A, 10B and 10C are diagrams to explain how a feeder section is assigned and locked to a substation, thereby forming a control route as a block section.

FIG. 10A shows the linear motor train LMC standing still in a first feeder section L1. At this point, the switching device 311 of the first substation SS1 corresponding to the feeder section L1 is set at the standby position SWOFF. Thus, no substation SS is assigned to the feeder section L1, nor has a control route been determined. The train LMC is halted while being supported by the wheels WH, which are locked by the disc brake 25, on the rail.

Figure 10B:
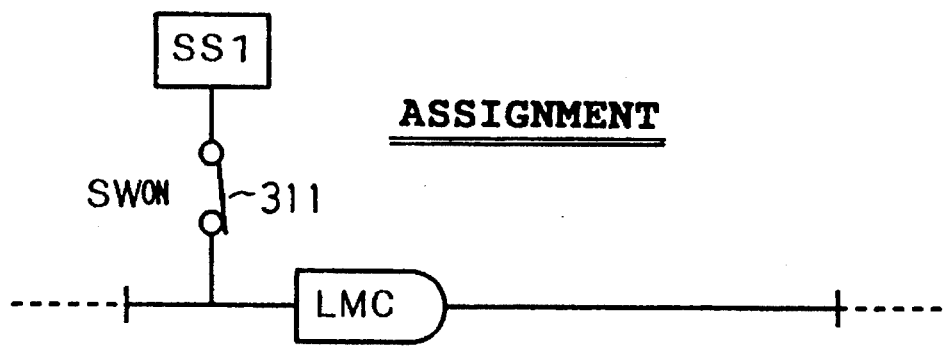

When the control center CTLRM informs, in step S110, the substation SS1 that it is time to start the train LMC and "YES" is determined at the step S120, the block control unit 7b of the substation SS1 instructs the switching device 311 to switch the connection to enabled position SWON, in step S130. The substation SS1 is thus assigned the first feeder section L1, as shown in FIG. 10B.

Figure 10C:
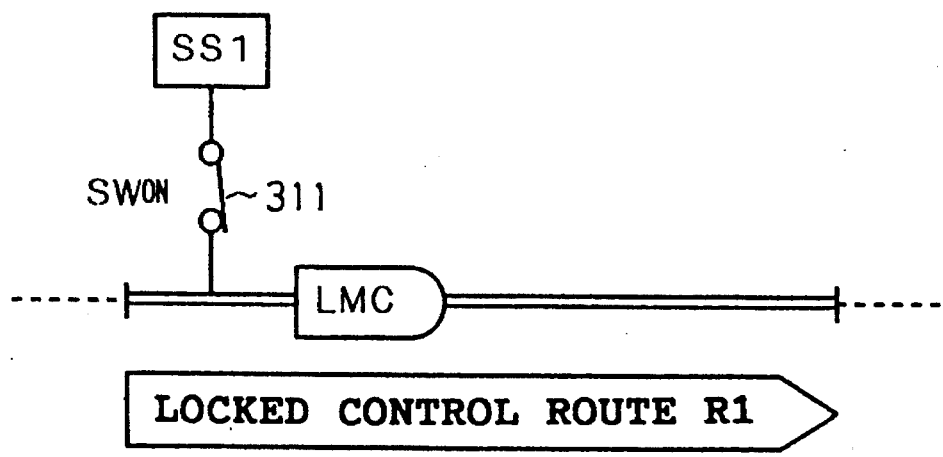
Figure 11A:
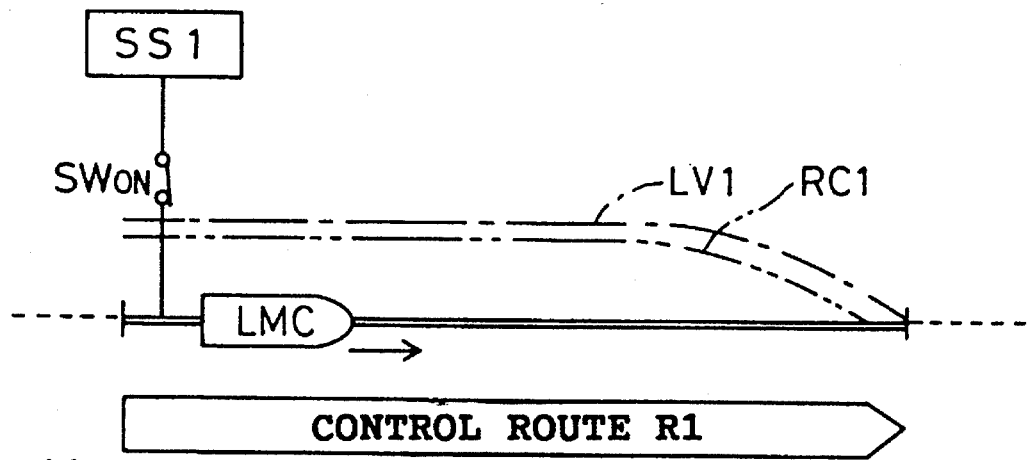
FIGS. 11A, 11B and 11C are diagrams to explain how the control route, once created, is released and returned to a normal feeder section in accordance with the progress of the train.

When the assignment is completed and "YES" is determined at the step S140, "substation locking" is effected for the first feeder section L1, and the direction is specified, thereby determining a first control route R1 as shown in FIG. 10C, in steps S150 through S155. Train operation control is performed, in step S300, for this first control route R1 according to corresponding ATC curve LV1 and run curve RC1, as shown in FIG. 11A. The velocity of the train relative to the position is thus controlled by the first substation SS1.

Figure 11B:
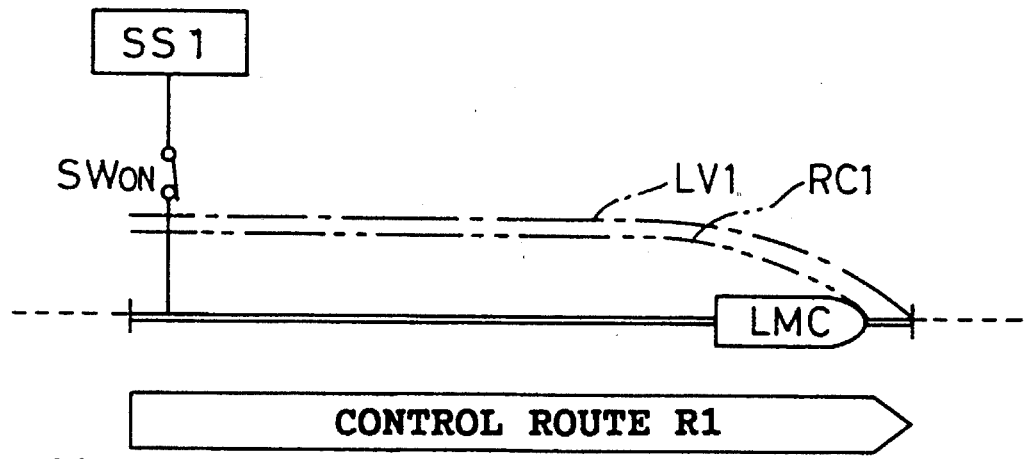

When the train LMC, with its velocity relative to its position controlled by the first substation SS1, arrives at the end of the first control route R1, the train LMC is decelerated and halted, as shown in FIG. 11B.

Figure 11C:
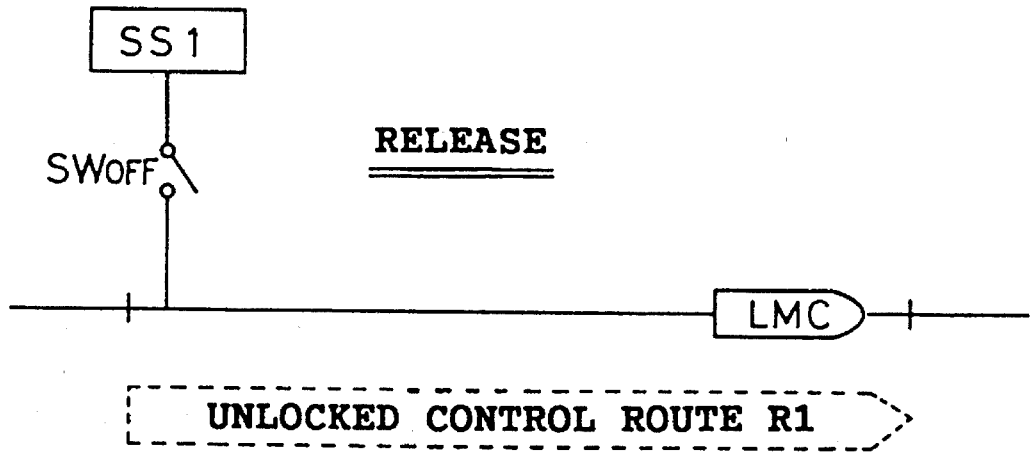

The control center CTLRM then instructs the first substation SS1 to revert back to the standby position SWOFF. In response, the block control unit 7b of the substation SS1 first performs "substation unlocking" for the first control route R1, and the switching device 311 is instructed to revert back to its standby position SWOFF, in step S160. Thereby, the switching device 311 is set to the standby position SWOFF and the first substation SS1 is released from the first feeder section L1. The control route is thus canceled, as shown in FIG. 11C.

It will be hereinafter described, with reference to FIGS. 12A, 12B, 12C and 13A, 13B, 13C, how the train LMC currently running on the first feeder section L1 is controlled so as to continue to run through a second feeder section L2.

Figure 12A:
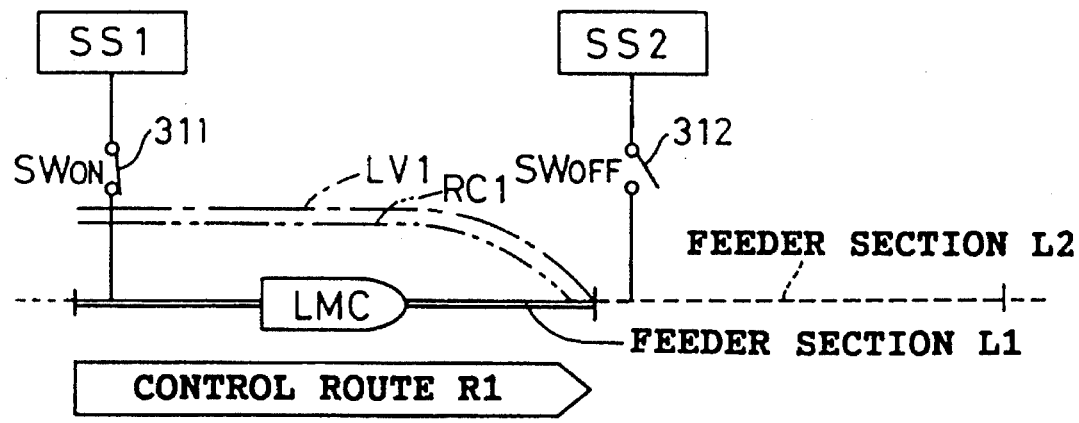
FIGS. 12A, 12B and 12C are diagrams to explain how the individual control routes are linked to form a greater control route.
Figure 12B:
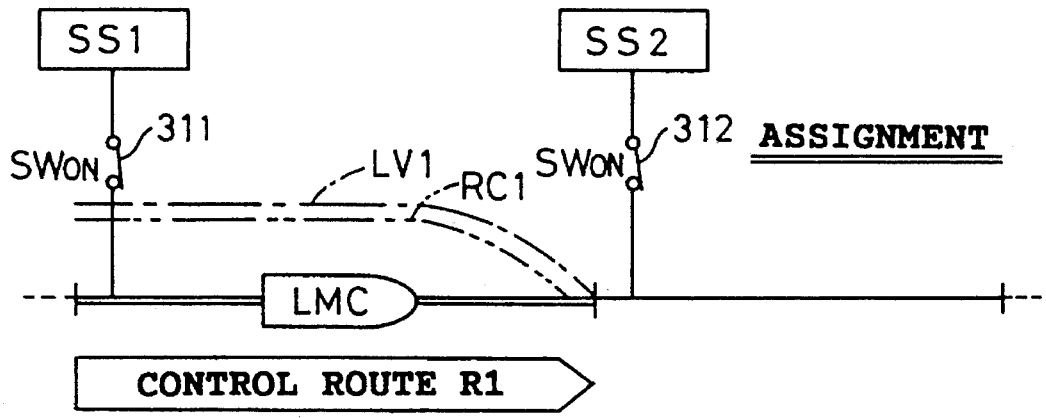

In FIG. 12A, the first substation SS1 is assigned the first feeder section L1 by the connection at the switching device 311, and the first feeder section L1 is locked as the first control route R1. The second substation SS2 is not assigned to the second feeder section L2, and the second feeder section L2 itself is left unlocked. At this point, if the control center CTLRM instructs to determine a longer control route including the second feeder section L2, the block control unit 7b of the second substation SS2 instructs the switching device 312 to shift its connection to enabled position SWON, in step S130.

In response, the connection at the switching device 312 of the second substation SS2 is switched from the standby position SWOFF to the enabled position SWON. As a result, the second substation SS2 is assigned the second feeder section L2.

Figure 12C:
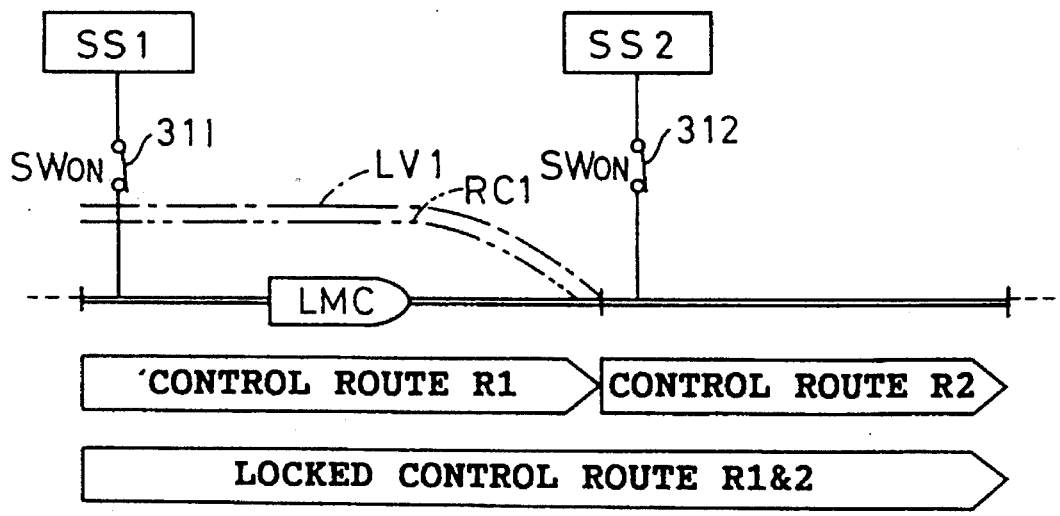

Following the determination of "YES" at step S140 and the assignment of a feeder section, "substation locking" is performed, in step S150, thereby prohibiting the cancellation of the assignment. Then, the second feeder section L2 is temporarily determined as a second control route R2 as shown in FIG. 12C, step S153. Subsequently, "linkage locking" is effected to integrate the first and second control route R1 and R2, thereby obtaining a linked control route R1&2, in step S155.

Figure 13A:
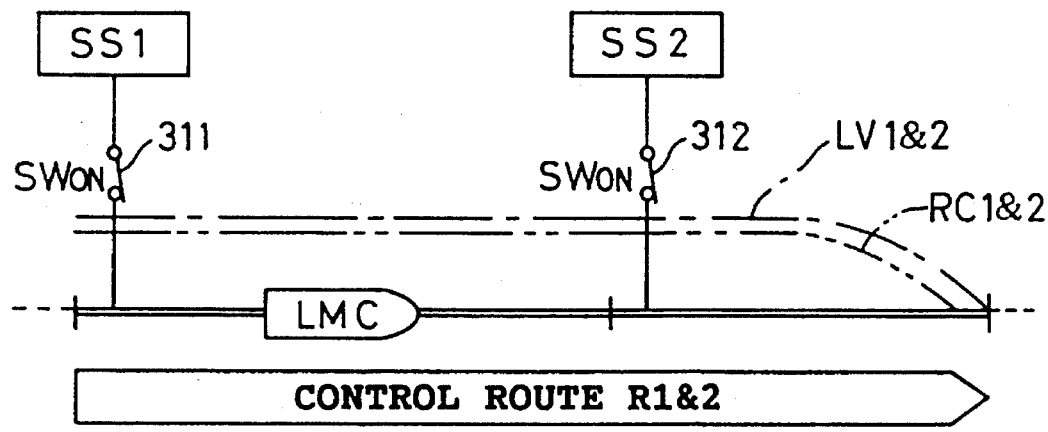
FIGS. 13A and 13B are diagrams to explain how the linked control routes are released from the read end in accordance with the progress of the train.

The first and second substations SS1 and SS2 cooperate with one another such that train operation can be controlled with the linked control routes 1&2 functioning as if they are a single feeder section, step S300. Specifically, an ATC curve LV1&2 and a run curve RC 1&2 shown in FIG. 13A are generated for the linked control route R1&2. Consequently, the velocity of the train LMC is continuously controlled toward the end of the second feeder section L2 without halting the train LMC at the border of the first and second feeder sections L1 and L2.

Figure 13B:
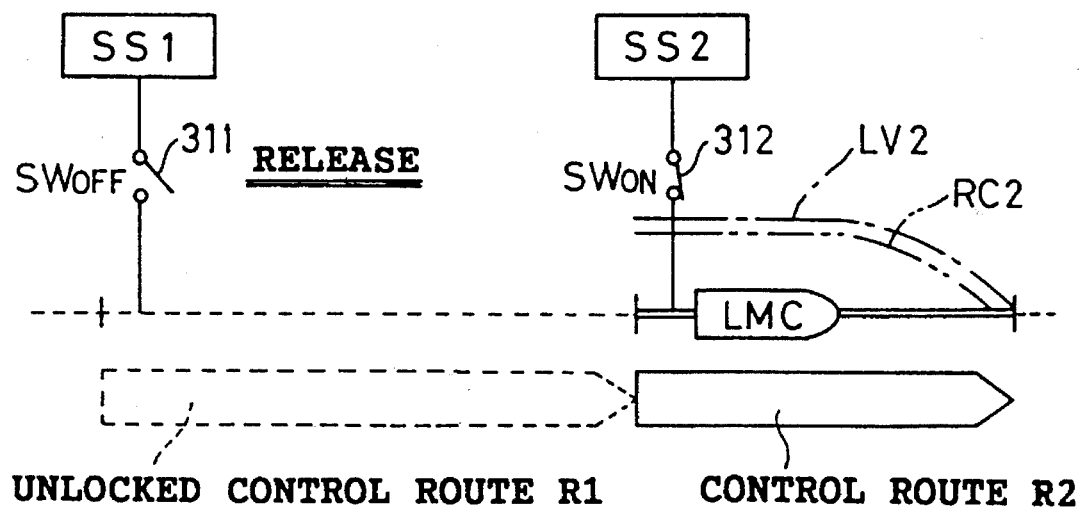

Concurrent with velocity control, the train LMC has passed through the first feeder section L1. At this point, "automatic recovery" is effected, in step S200 by performing "linkage unlocking" and "substation unlocking", steps S230 and S240, and separating the first substation SS1. As a result of the automatic recovery process, the linked control route 1&2 is curtailed to the second control route R2, and the ATC curve LV1&2 and the run curve RC1&2 are changed to an ATC curve LV2 and a run curve RC2, respectively, as shown in FIG. 13B.

Thus, only when the substation SS is assigned a feeder section and a control route is derived, the run curve RC is generated for the determined control route. Therefore, during the control of the velocity relative to the position according to the generated run curve RC, no uncontrollable section may arise. Thus, the train operation can be safely performed.

While the control process explained above is necessary and sufficient when only one train is running on the railroad, it is not sufficient for practical commercial use, e.g. if the railroad has two or more trains running thereon. Therefore, the present control process is developed to be adapted for practical use in commercial linear motor trains.

The developed control process will be hereinafter described with reference to FIGS. 14–17.

The control center CTLRM constantly examines the control route, at first step. S410 in order to determine, if it is time to change the control route or the border of the feeder section. If no such alteration is required, the instant process ends. If an alteration is required and "YES" is determined at the step S410, it is determined at next step S420 whether or not the alteration is prohibited by the absolute condition rules listed below.

[1] The train is currently under instructions to perform an emergency halt. In this case, any alteration is prohibited since the alteration may interfere with the emergency stop.
[2] The alteration is an assignment alteration for assigning a substation a feeder section other than those that the substation can control.
[3] The alteration is a border alteration that results in a value of zero or a negative value as the length of the feeder section which is assigned to any substation.
[4] The switching device at a new border after the alteration has a closure fault problem. Thus, the new border cannot be obtained.
[5] As a result of an alteration of the border, the switching device having an opening fault problem will lie midway in the feeder section. In this case, the alteration is prohibited because one feeder section must be completely integrally connected. As long as there is a faulty switching device, a border of a feeder section must be at the switching device.

Besides those listed above, there may be a variety of other absolute condition rules which prohibit the alteration of the control route or the border of the feeder section at the step S420. If it is determined at step S420 that the alteration is prohibited by the absolute condition rules, the alteration is conclusively prohibited at next step S430.

If it is determined that the alteration is not prohibited by the absolute condition rules, it is next determined, according to the relative position of the trains, whether the alteration should be effected or prohibited.

First, it is determined, at step S440, whether the control route will be curtailed or elongated at its front end as a result of the alteration of the border of the feeder section or the alteration of the control route.

Figure 18A:
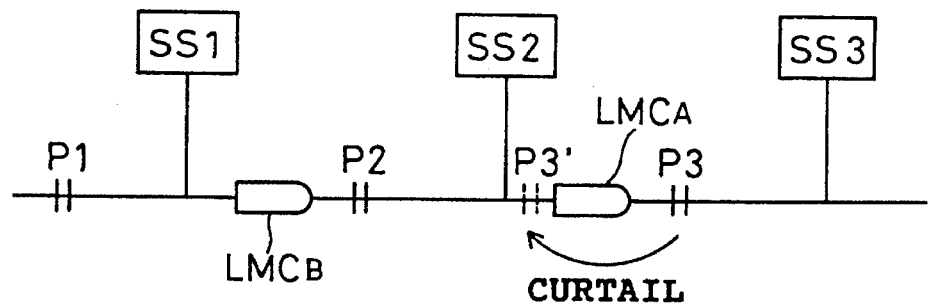
FIGS. 18A through 18J are illustrations to explain the curtailment and elongation of the control route performed by the embodiment.

The curtailment of the feeder section at its front end is required in the situation, for example, shown in FIG. 18A.

The first substation SS1 in that figure is controlling the feeder section between borders P1 and P2. The second substation SS2 is controlling the feeder section between borders P2 and P3. A linear motor train LMCB is now approaching the border P2 between the first and second substations SS1 and SS2. However, the train LMCB cannot proceed past the border P2 and must be decelerated. This is because the further area after the border P2 is the feeder section between borders P2 and P3 and the second substation SS2 is controlling another train LMCA. As a solution, the border P3 between the second and third substation SS2 and SS3 is changed to the border P3'. Thereby, the train LMCA is no longer in the feeder section controlled by the second substation SS2 and the train LMCB can enter the area without being decelerated or halted.

Figure 18B:
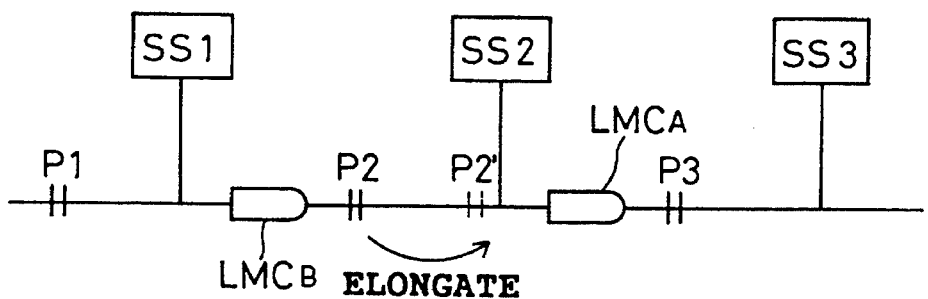

The elongation of the feeder section at its front end is required in the situation, for example, shown in FIG. 18B.

Similarly to the case shown in FIG. 18A, the train LMCB is approaching the border P2 between the first and second substation SS1 and SS2, but cannot enter into the feeder section where the second substation SS2 is currently controlling the train LMCA. As another solution, the border P2 is changed to the border P2', thereby elongating the feeder section controlled by the first substation SS1. The train LMCB can proceed further up to the border P2' without being decelerated or halted.

Thus, both the methods of curtailment and elongation of the feeder section can be adopted for either of the cases shown in FIGS. 18A and 18B. Alternatively, if another train exists in the feeder section controlled by the third substation SS3, only the elongation shown in FIG. 18B can be adopted. The selection of the curtailment or elongation is made on a case-by-case basis.

Figure 14:
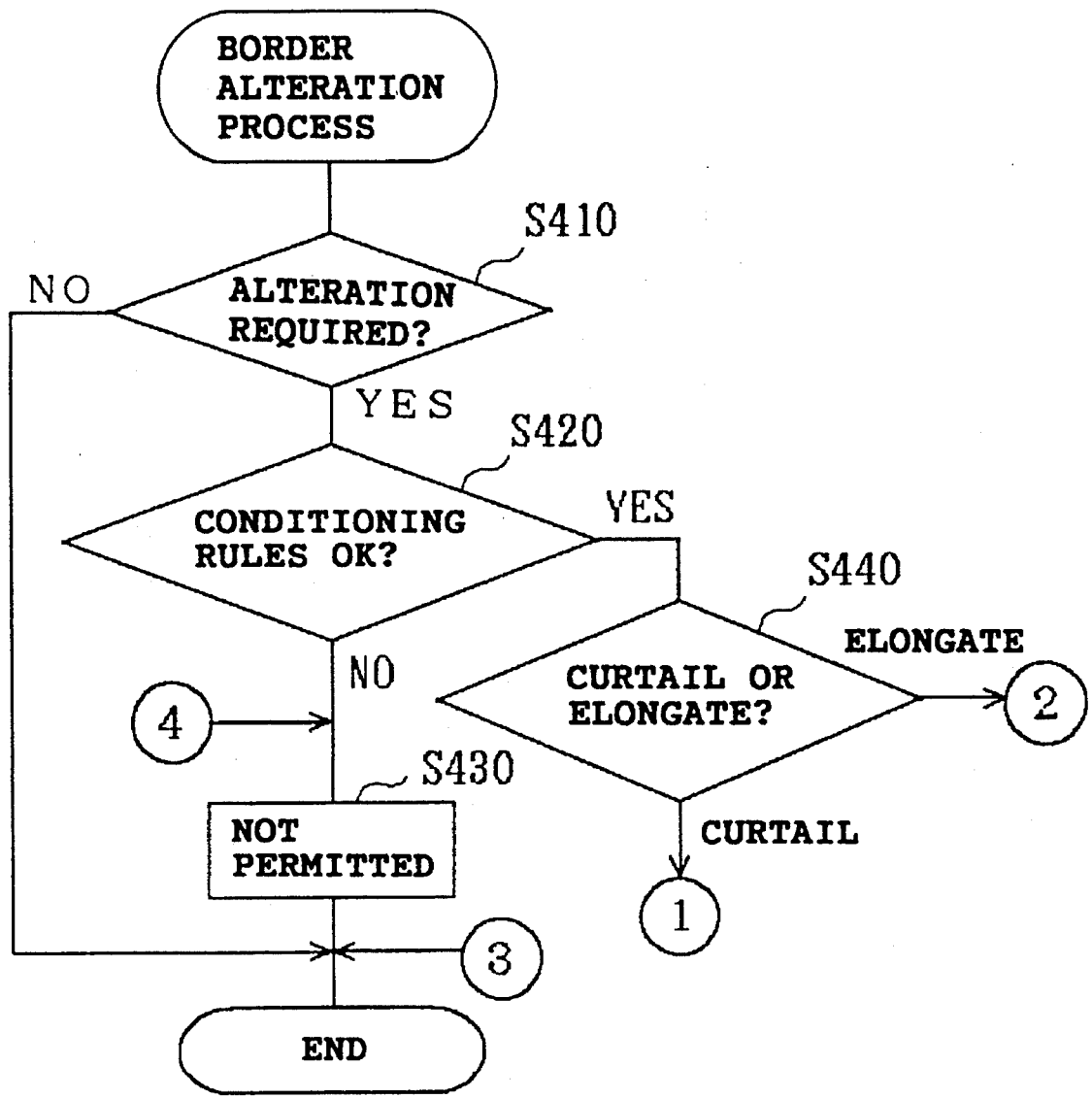
FIG. 14 is a partial flowchart of the process effected by the embodiment when the control route or the border between feeder sections is to be changed.
Figure 15:
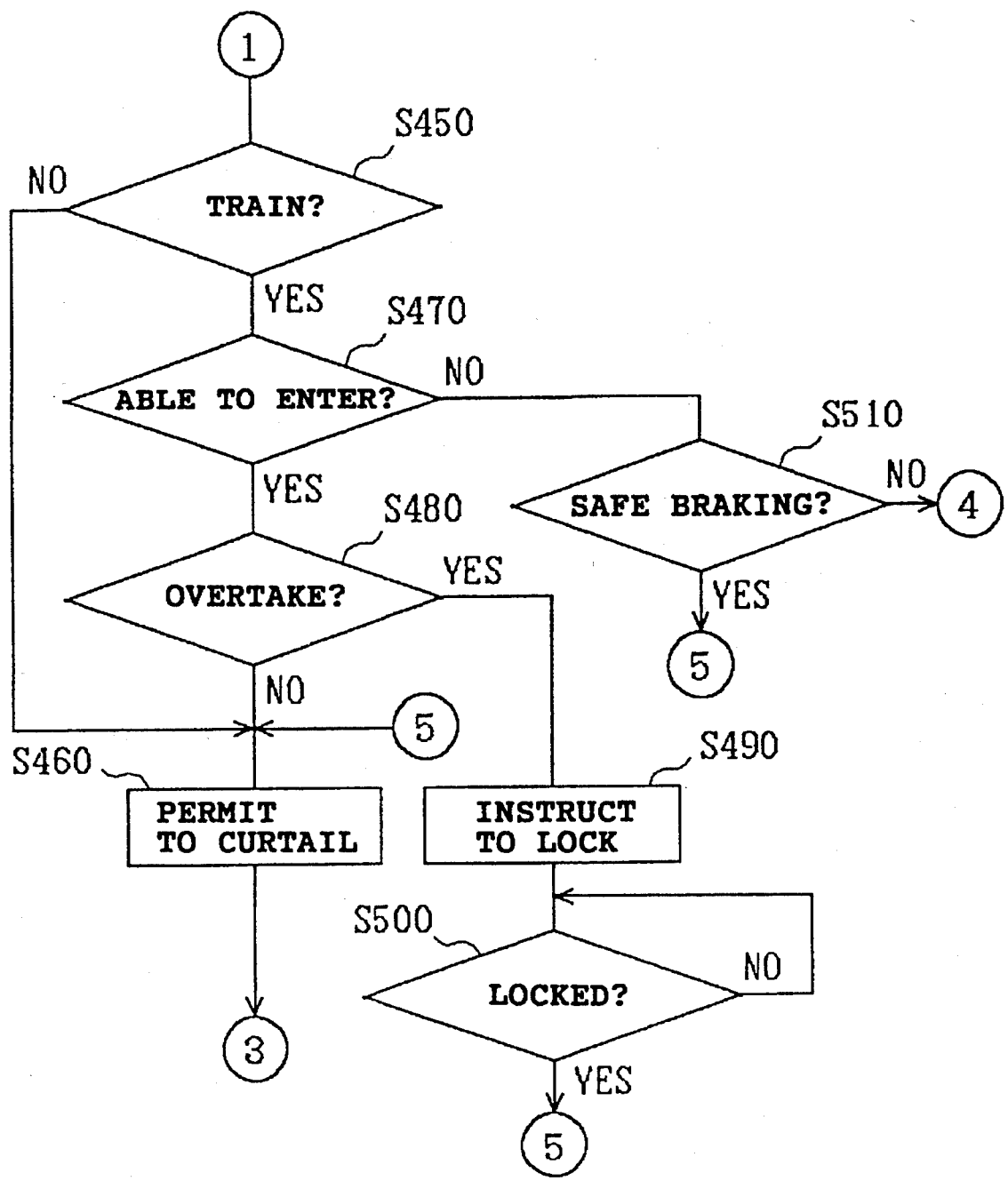
FIG. 15 is a partial flowchart of the process effected by the embodiment when the control route or the border between feeder sections is to be changed.

When the curtailment of the feeder section is to be performed, the process proceeds from the step shown in FIG. 14 to the steps shown in FIG. 15. At step S450, it is determined whether there is any train running along the feeder section to be curtailed. If "NO" is determined at the step S450, the curtailment of the feeder section is permitted and effected, in step S460. In contrast, when "YES" is determined at the step S450, the flow goes to step S470.

Figure 18C:
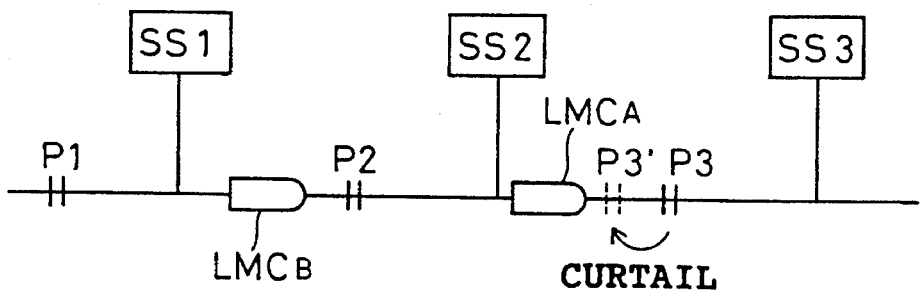
Figure 18D:
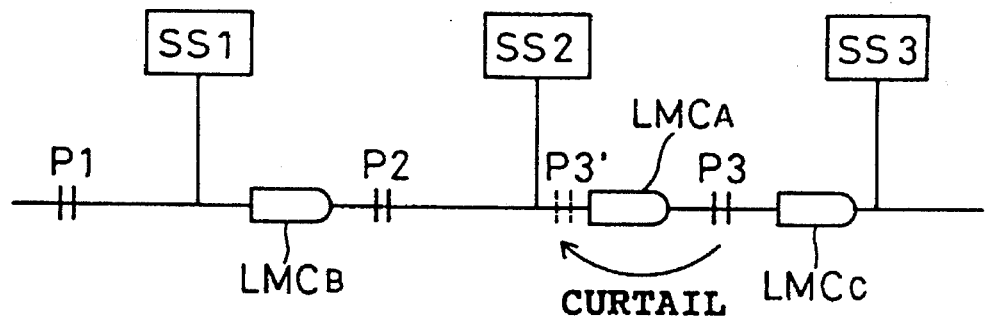
Figure 18E:
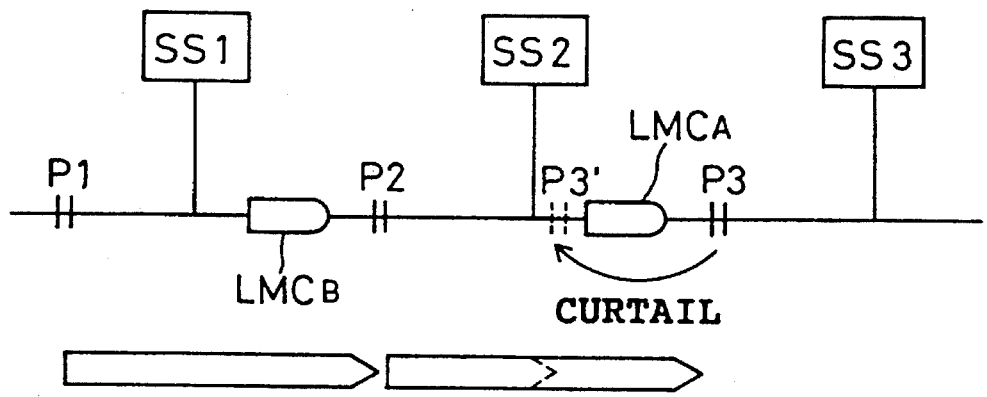

Two possible situations resulting in the determination of "YES" at the step S450 are shown in FIGS. 18A and 18C. Following this determination, it is determined whether or not the train may enter the feeder section ahead, S470. If the feeder section ahead is closed for the train LMCC as shown in FIG. 18D, "NO" is determined at step S470. If "YES" is determined at step S470, it is next determined, in step S480, whether the new border will be placed behind the train to be controlled. In other words, it is determined at this step S480 whether or not the train to be controlled will be positioned out of the control route having the new border at its front end, as shown in FIG. 18E in which the train LMCA is positioned out of its control route RA. If "NO" is determined at the step S480, the curtailment of the feeder section is permitted, in step S460.

In contrast, when "YES" is determined at the step S480, the above described steps S130–S155 are effected. As a result, "linkage locking" is performed between the feeder section ahead and the current control route, and a new control route is thereby obtained, in step S490. When it is determined at step S500 that the new control route determination is completed, the curtailment is permitted, in step S460. Thus, since the curtailment of the feeder section is not effected until the control route is adapted for further progress of the train, no control failure is caused due to the alteration of the border.

On the other hand, if it is determined at the step S470 that the train must not enter the feeder section ahead, the following steps are performed. The determination prohibiting the entrance of a train is made when the feeder section ahead is closed for any other train.

Figure 18F:
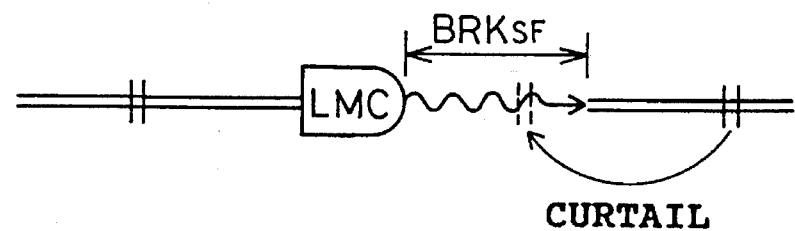

When the feeder section ahead is thus closed, it is examined, in step S510, whether or not the front end of the control route will come, as a result of the curtailment, in the range of the safe braking distance BRKSF as shown in FIG. 18F. If "YES" is determined at the step S510, the curtailment of the feeder section is not permitted, in step S430. If "NO" is determined at the step S510, the curtailment of the feeder section is permitted, in step S460.

Figure 16:
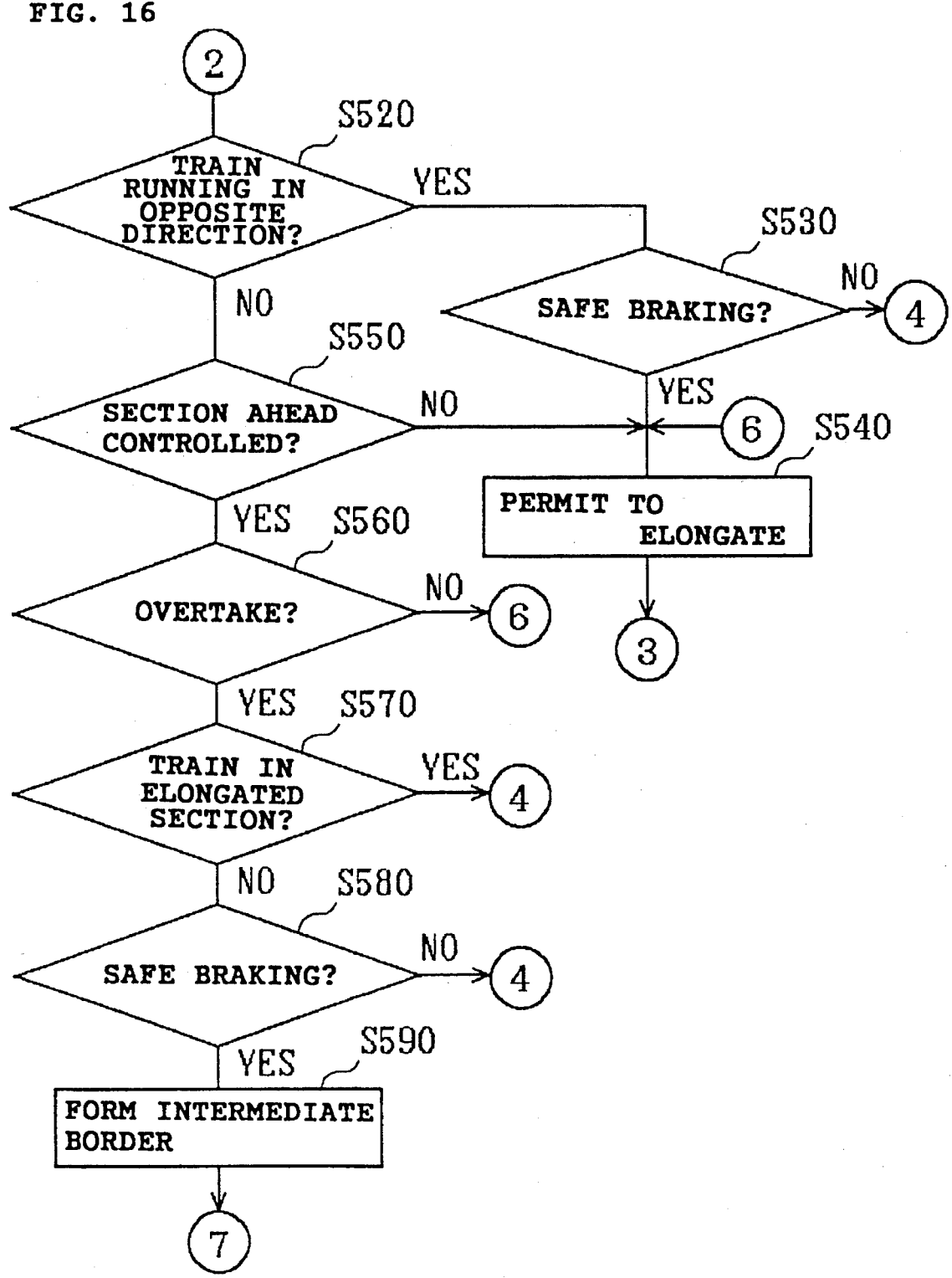
FIG. 16 is a partial flowchart of the process effected by the embodiment when the control route or the border between feeder sections is to be changed.

In contrast, when it is determined at the step S440 that an elongation of the feeder section is to be made as the alteration of the border, the flow proceeds to the process shown in FIG. 16. At the first step S520 of the process, it is first examined whether or not the feeder section that will be shortened by the elongated feeder section is an area where train control operation is engaged for controlling a train running in the opposite direction. If "YES" is determined at the step S520, it is next determined, at step S530, whether the new border after the elongated feeder section will allow safe braking of the train running in the opposite direction. When "YES" is determined at the step S530, the elongation of the feeder section is permitted, in step S540, otherwise the elongation of the feeder section is not permitted, in step S430.

Alternatively, if "NO" is determined at step S520, it is next determined, at step S550, whether the substation which is assigned the feeder section ahead is currently performing velocity control of another train. If "NO" is determined at step S550, e.g. if the feeder section is not yet assigned to a substation nor closed for any other train, the elongation of the feeder section is permitted, in S540.

Figure 18G:
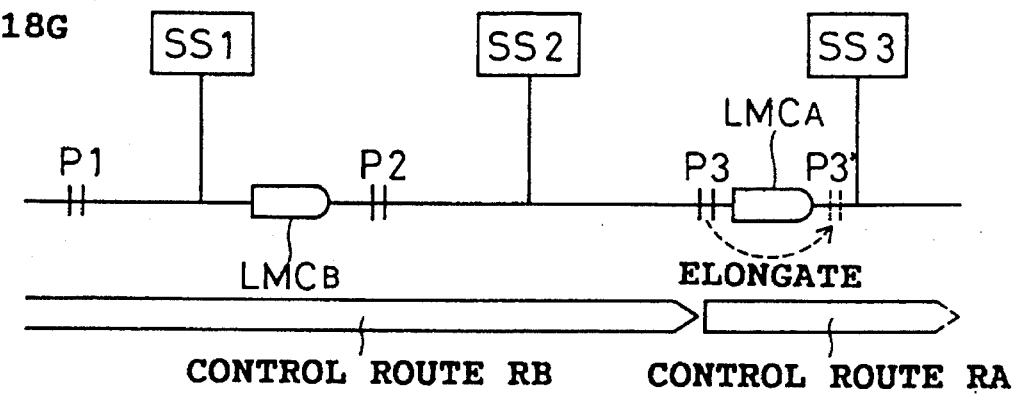

If "YES" is determined at step S550, it is examined, in step S560, whether the new border of the elongated feeder section will be positioned ahead of a preceding train running along the feeder section ahead, as shown in FIG. 18G. It should be noted here that the control routes RA and RB are for controlling the trains LMCA and LMCB, respectively. When "NO" is determined at the step S560, the elongation of the feeder section is permitted, in step S540.

Alternatively, when "YES" is determined at step S560, it is further examined, at step S570, whether or not a train is in the feeder section (P2–P3) to be elongated. If "YES" is determined at step S570, the elongation of the feeder section is not permitted, in step S430.

Determination of "NO" at step S570 is made when there is one or more "buffer" feeder sections between the preceding train LMCA and the following train LMCB as shown in FIG. 18G.

Figure 17:
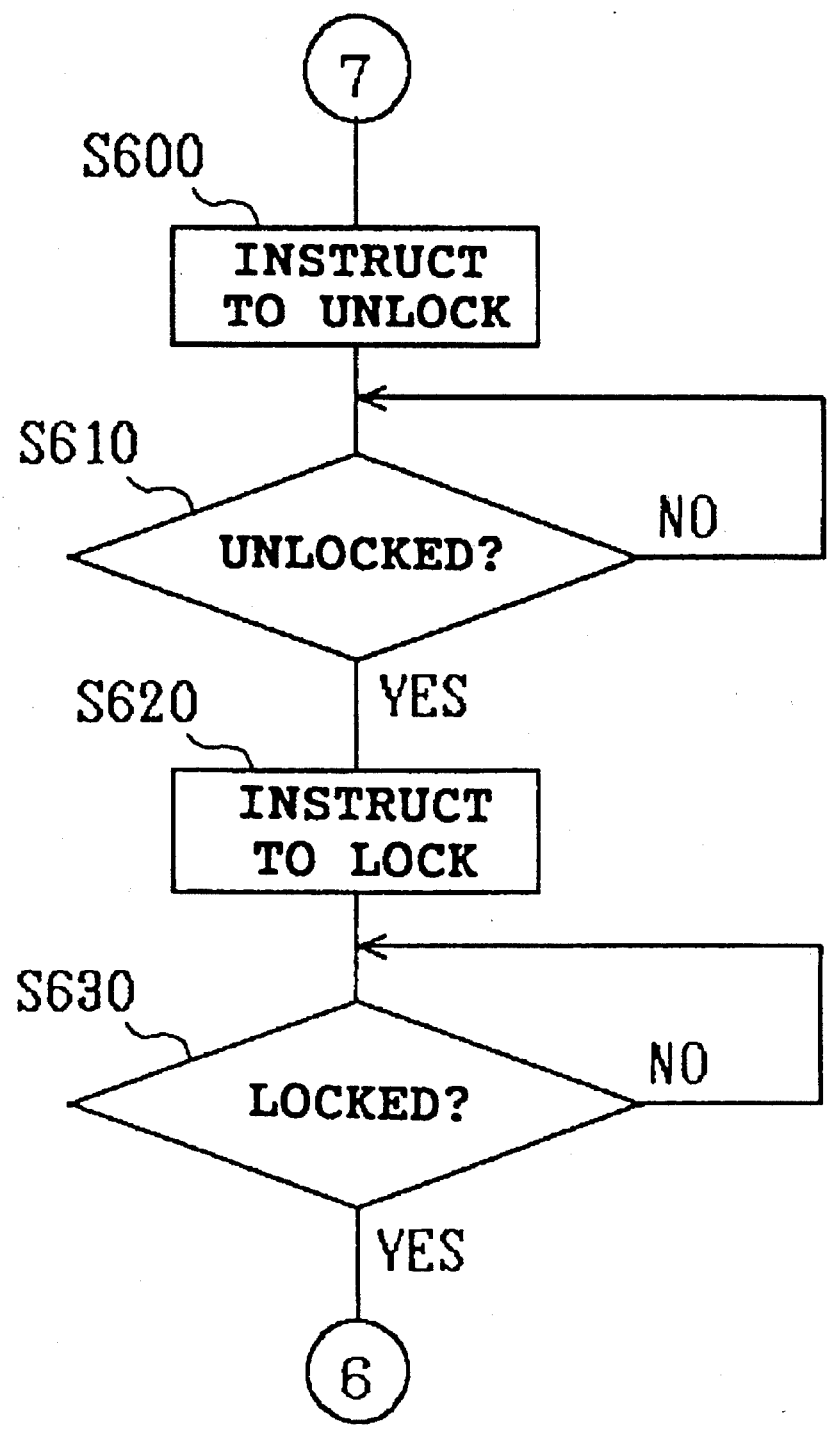
FIG. 17 is a partial flowchart of the process effected by the embodiment when the control route or the border between feeder sections is to be changed.
Figure 18H:
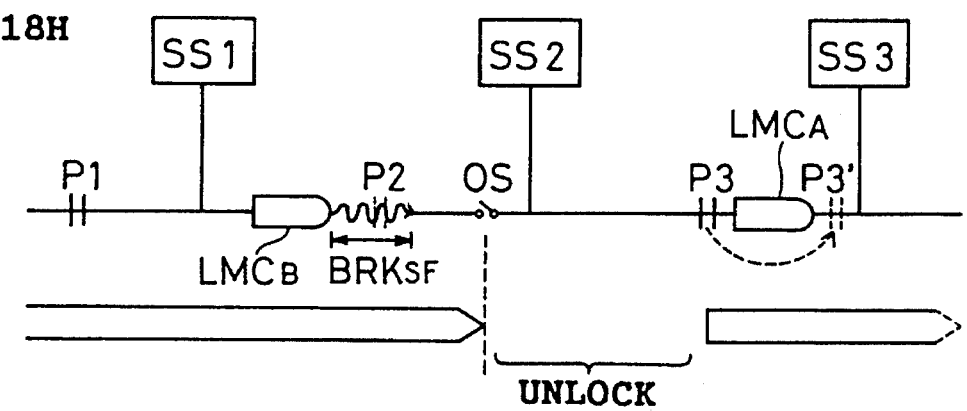

When "NO" is determined at step S570, it is next determined, at step S580, whether at least one sectional switching device OS exists, as shown in FIG. 18H, ahead of the safe braking distance BRKSF of the following train LMCB. If there is no such a sectional switching device, the elongation of the feeder section is not permitted, S430. If there is a sectional switching device, which will be hereinafter referred to as intermediate sectional switching device, step S590 is performed and the flow proceeds to the process shown in FIG. 17.

At step S590, a not-shown sectional switching device between the intermediate switching device OS and the following train LMCB is first closed, and the intermediate sectional switching device OS is opened, thereby forming a border of the feeder section at the location of the intermediate section switching device, in step S590.

Figure 18I:
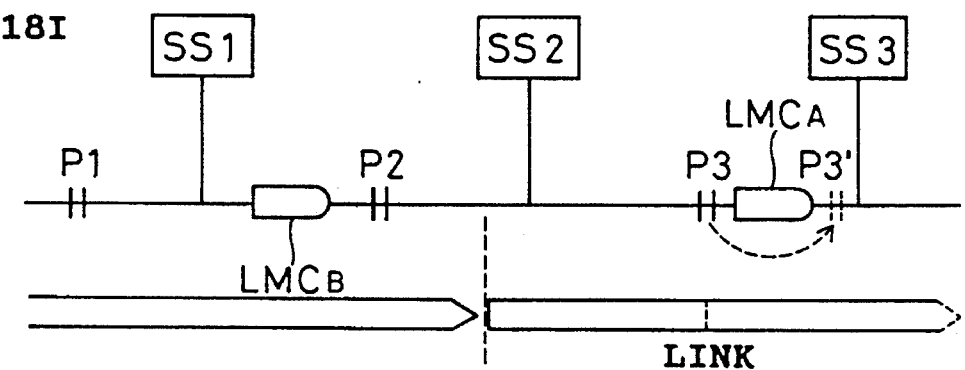
Figure 18J:
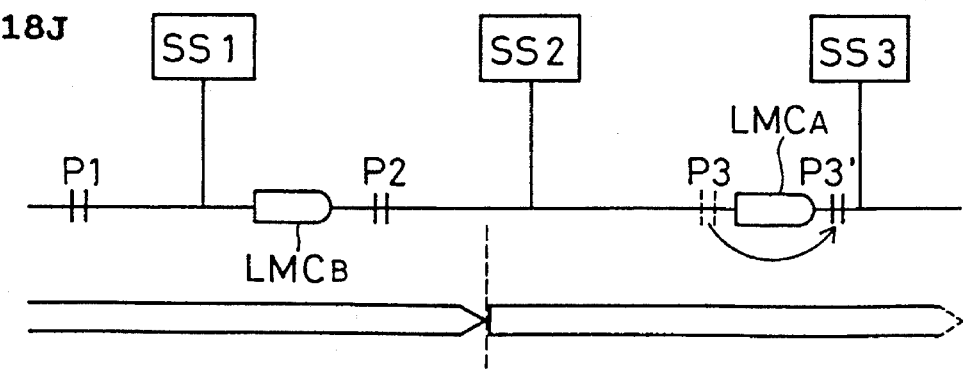

At steps S600 and S610 of the process shown in FIG. 17, the feeder section ahead of the intermediate sectional switching device has its "linkage unlocked" and is thereby released from the control route for the following train by "linkage unlocking", as shown in FIG. 18H. Next, "linkage locking" is effected as shown in FIG. 18I to connect the released feeder section with the control route for the preceding train LMCA, in steps S620 and S630. Consequently, the elongation of the feeder section from P2–P3 to P2–P3' is permitted as shown in FIG. 18J, step S540.

Thus, even when the alteration of the control route or the border of the feeder sections is required, the alteration is not caused if absolutely prohibited by the predetermined condition rules. Moreover, even if the alteration is not prohibited, the alteration is not caused when it is determined inappropriate based on the relative positions of the trains. Consequently, safe train operation takes priority over the alteration of the control route or the border of the feeder sections.

It will be hereunder explained how the control route or the feeder section border is actually altered while being checked against the prohibition condition rules.

As shown in FIG. 19A, substations SS1, SS2, SS3 and SS4 are assigned feeder sections L1, L2, L3, and L4, respectively. A control route R1, control route R2 and control route R3 are locked to each other, thereby forming a control route R1&2&3. A train LMC, which is in the first feeder section L1, has its safe braking distance BRKSF extending to the middle of the second feeder section L2. When the curtailment of the control route is instructed in this situation, the aforementioned determination is performed to check if the alteration is prohibited.

If the curtailment of the control route is to be made simply by excluding the third feeder section L3 from the control route, the curtailment is effected regardless of the presence of the train LMCF in the feeder section L4. This is because the curtailment does not affect the safe braking distance of the following train LMC. Consequently, the control route is altered as shown in FIG. 19B. The curtailment of the control route by shortening the feeder section L3 at its front end is effected on the same ground.

Figure 20:
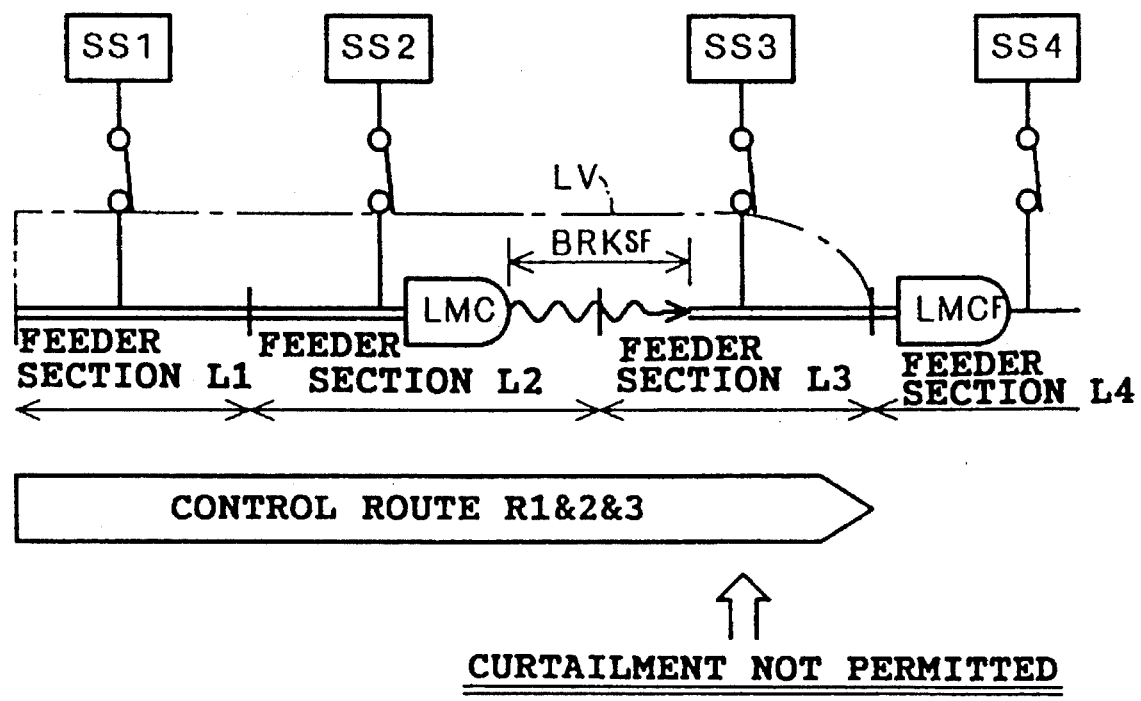
FIGS. 20 is an illustration to explain the curtailment of the control route performed by the embodiment.

In contrast, as shown in FIG. 20, if the preceding train LMCF is running in the feeder section L4 immediately in front of the following train LMC, curtailment is not permitted since it will affect a safe braking of the following train LMC.

An example of an arrangement, which is preferably provided when performing the velocity control in the present apparatus, will be explained hereinafter. The arrangement is for adjusting the data supply from the detectors 13 and the repeater stations 11.

Figure 21:
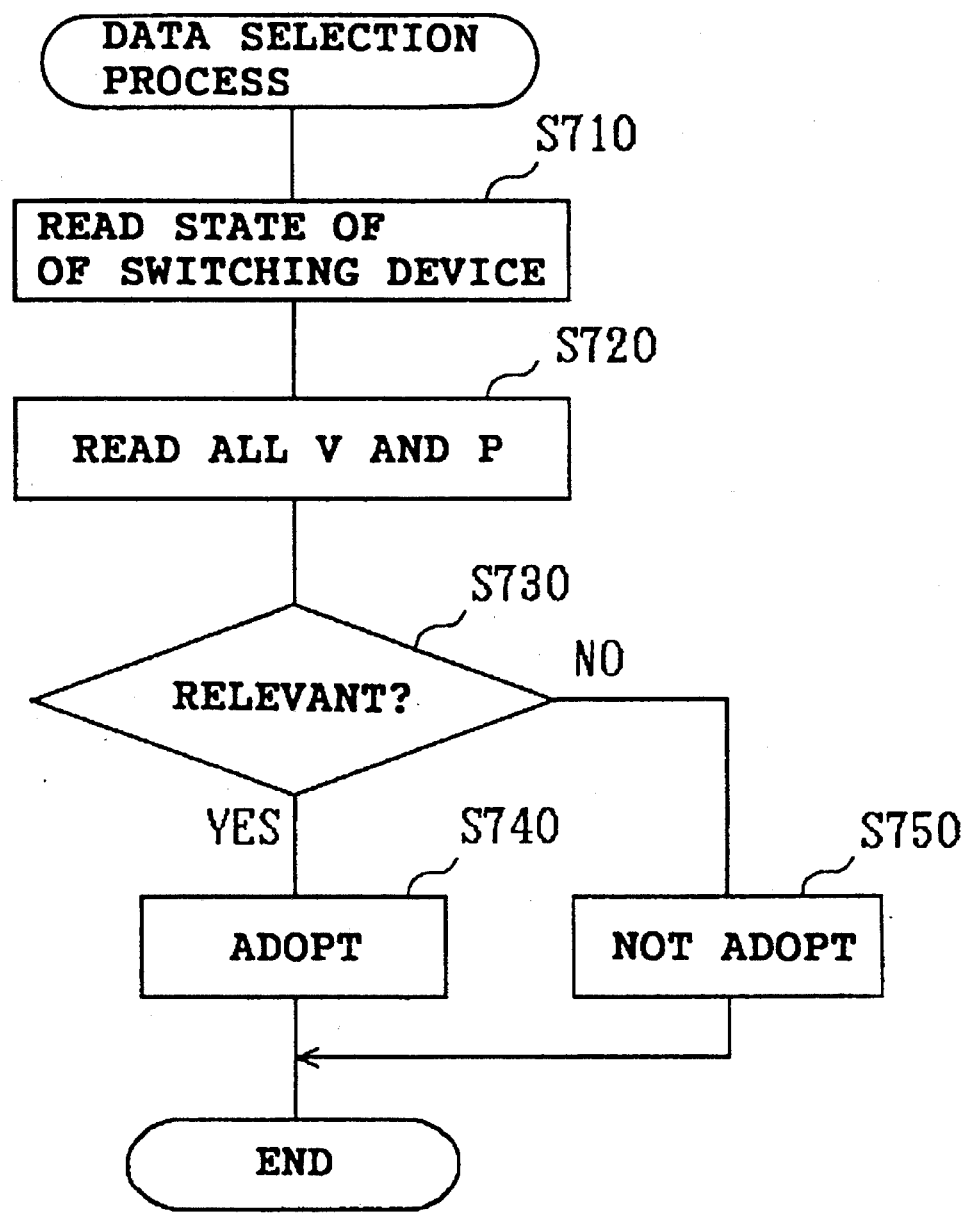
FIG. 21 is a flowchart of the process to determine whether the data is usable in effecting the position versus velocity control.

The process shown in the flowchart of FIG. 21 is effected in accordance with the aforementioned arrangement. In the arrangement, a substation SS receives data from a plurality of detectors, and selects relevant data for use in controlling the train's velocity in relation to its position. Specifically, when substation SS receives the velocity V and the position P via the repeater station 11, the block control unit 7b first determines whether the each of the sectional switching devices OS is closed or opened, in step S710, and then reads all of the velocity V and the position P data received via its corresponding repeater stations 11, in step S720. According to whether each sectional switching device OS is opened or closed and according to the detector, the block control unit 7b consequently selects relevant data, in step S730, and thus the data is adopted for use in performing the velocity control relative to the position, in step S740, or the data is discarded, in step S750.

Figure 22:
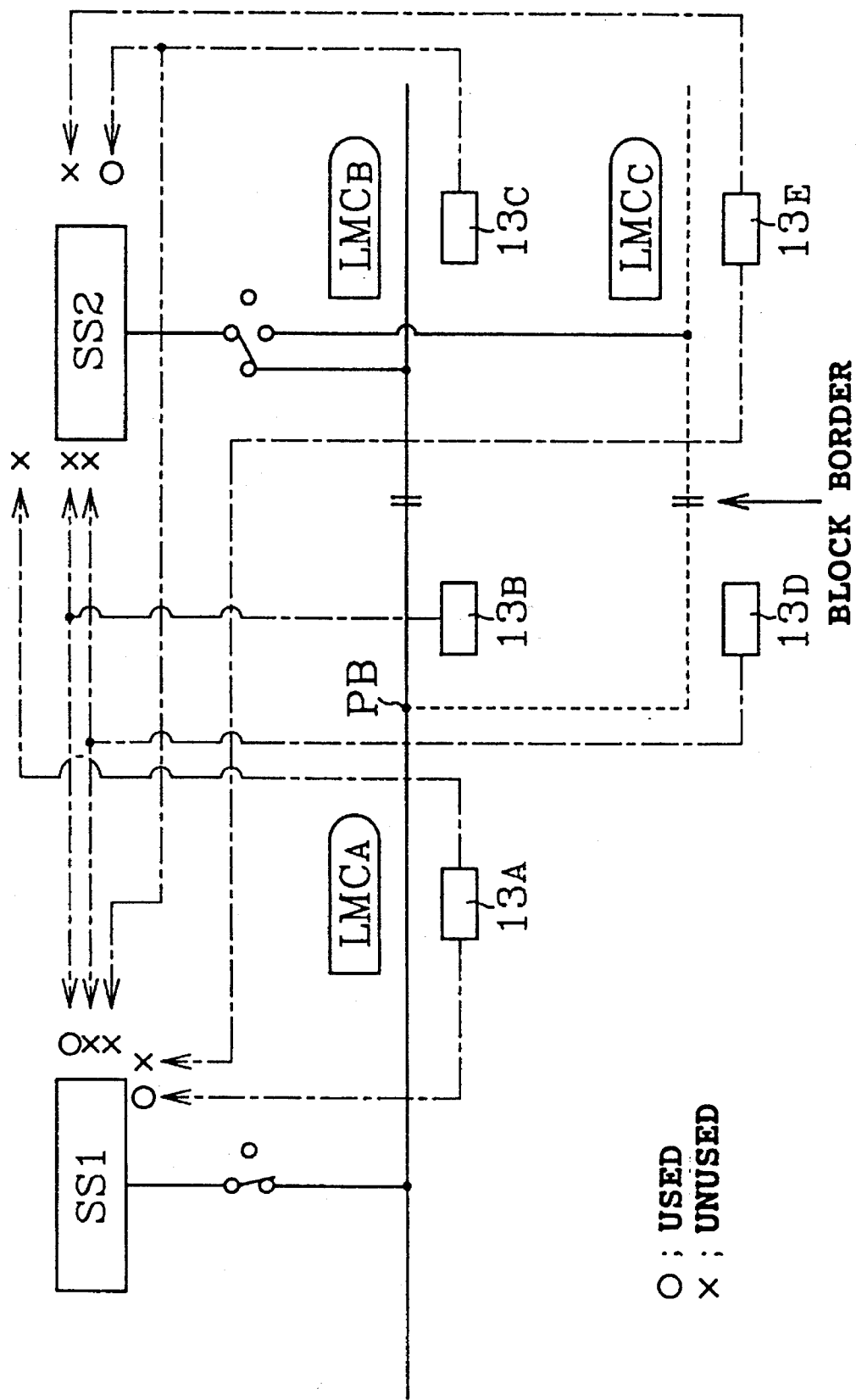
FIG. 22 is a diagram to explain what data is selected in effecting the control of train operation by the embodiment.

For example, in FIG. 22, the first substation SS1 is assigned a control route to drive the train LMCA up to the block border shown in that figure. Likewise, the second substation SS2 is assigned another control route ahead to drive the train LMCB. Another railway line, shown by a broken line in that figure, branching from point PB and having a train LMCC thereon is not assigned to any of the substations. A detector 13A is assigned the portion, shown by a solid line, up to the branching point PB, and a detector 13B is assigned the portion from the branching point PB to the block border. A detector 13C is assigned the portion, also shown by a solid line, ahead of the block border having the train LMCB thereon, a detector 13D is assigned the portion shown by a broken line from the branching point PB to the block border, and a detector 13E is assigned the portion shown by a broken line ahead of the block border having the train LMCC thereon.

In the illustrated situation, the first substation SS1 perceives, via its block control unit 7b, that only the data from the detectors 13A and 13B are usable for the velocity control. Accordingly, the velocity controlling unit 7a of the first substation SS1 refers only to the data from the detectors 13A and 13B, ignoring the data from the detectors 13C–13E. It is thus prevented from erroneously determining that the train LMCA is halted according to the data related to the train LMCC.

Likewise, the second substation SS2 perceives that only the data from the detector 13C is usable and performs the velocity control according to the data from the detector 13C. Therefore, it is also prevented at the second substation SS2 from controlling the train LMCB according to the data related to the train LMCA or LMCC.

The data to be used for velocity control is varied according to the connection between the sectional switching devices and the assignment of the feeder sections to the substations.

This invention has been described above with reference to the preferred embodiment as shown in the drawings. Modifications and alterations may become apparent to one skilled in the art upon reading and understanding the specification. Despite the use of the preferred embodiment for illustration purposes, it is intended to include all such modifications and alterations within the scope and spirit of the appended claims.

For instance, while the apparatus of the embodiment is applied to a train, the velocity of which is controlled by any mechanism provided on the ground, the invention may also be applied to trains controlled by a system equipped on board the train. The invention may be applied not only to a linear motor railway system but also to any other common railway system wherein power is supplied to a specific section of track requiring the power.

Wherefore, having described the present invention, what is claimed is:

1. An apparatus for controlling movement of a train along a railway system, the railway system being formed by a plurality of feeder sections and a plurality of substations being spaced along the railway system, each of said plurality of substations being assignable one of said plurality of feeder sections, and each of said plurality of substations, when activated, supplying power to the assigned feeder section for controlling operation of a train running along the assigned feeder section, said apparatus comprising:

route determining means for determining a route to be taken by the train;

assigning means for assigning a said feeder section, along the determined route, to a said substation whereby said assigned feeder section and said substation are electrically controllable;

substation locking means for locking said assigned feeder section to said substation such that cancellation of the assignment of said assigned feeder section to said substation is prohibited until predetermined conditions occur;

direction designation means for designating a moving direction of the train along said assigned feeder section locked to said substation;

operational control means for controlling operation of the train according to a control route, said control route being determined from said assigned feeder section locked to said substation and from information concerning the moving direction of the train;

linkage locking means for linking and locking a plurality of serially arranged individual control routes with one another to form an enlarged control route, and all of said substations along the linked and lock enlarged control route cooperate with one another for controlling operation of the train;

wherein said apparatus further comprises:

passage determination means for determining whether a train leaves any one of said feeder sections included within said enlarged control route;

automatic linkage unlocking means for automatically unlocking each said feeder section locked by said linkage locking means when said passage determination means determines that the train left that feeder section;

automatic substation unlocking means for automatically unlocking the substation locked to the unlocked feeder section, said automatic substation unlocking means only operating after said automatic linkage unlocking means automatically unlocks the feeder section; and assignment cancellation means, included within said assigning means, for canceling the assignment of the substation for the feeder section which was unlocked from the substation.

2. The apparatus according to claim 1, wherein said route determining means further comprises:

route examining means for determining whether the determined route of said route determining means will result in an alteration of the control route and whether the alteration of the control route is prohibited by predetermined rules; and route change prohibiting means for prohibiting the alteration of the control route when said route examining means determines that the alteration of the control route is prohibited by the predetermined rules.

3. The apparatus according to claim 2, wherein each said feeder section is defined by borders and said apparatus further comprises:

border changing means for changing the borders between adjacent feeder sections;

border checking means for determining whether the change of a border between adjacent feeder sections, to be effected by said border changing means, is prohibited by the predetermined rules; and border change prohibiting means for prohibiting said border changing means from changing the border when said border checking means determines that the change of a border is prohibited by the predetermined rules.

4. The apparatus according to claim 3, wherein said apparatus further comprises:

a plurality of data receiving means, provided along the railway, for receiving data from the train traveling along the railway; and selective communication means for selectively communicating the received data, as the data to be utilized in controlling operation of the train, only to the substation which is assigned to the feeder section having said data receiving means receiving the data from the train.

5. The apparatus according to claim 3, wherein said border checking means when: (1) the border change concerns curtailing a feeder section, (2) there is another train in the feeder section to be curtailed, and (3) curtailment of the feeder section would result in at least one of:

(i) placing the train in the feeder section to be curtailed outside of the curtailed section; and (ii) placing a new border which is ahead of the train in the feeder section to be curtailed but within a safe braking distance of the train in the feeder section to be curtailed;

determines that the border change adversely effects safe operation of the train.

6. The apparatus according to claim 3, wherein said border checking means when: (1) the border change concerns elongating a feeder section, (2) there is another train in the feeder section to be elongated, (3) a feeder section ahead of the feeder section to be elongated contains another train running in the opposite direction than the train in the feeder section to be elongated and (4) the border change would result in at least one of:

(i) placing the train running in the opposite direction in the elongated feeder section; and (ii) placing a new border within a safe braking distance of the train running in the opposite direction;

determines that the border change adversely effects safe operation of the train.

7. The apparatus according to claim 3, wherein said border checking means when: (1) the border change concerns elongating a feeder section, (2) there is another train in the feeder section to be elongated, (3) a feeder section ahead of the feeder section to be elongated contains a train running in the same direction as the train in the feeder section to be elongated and (4) the border change would result in at least one of:

(i) placing the train running in the same direction in the elongated feeder section; and (ii) elimination of a switching device, ahead of the train in the feeder section to be elongated, that could be activated to form the new border;

determines that the border change adversely effects safe operation of the train.

8. The apparatus according to claim 1, wherein said apparatus further comprises:

a plurality of data receiving means, provided along the railway, for receiving data from the train traveling along the railway; and selective communication means for selectively communicating the received data, as the data to be utilized in controlling operation of the train, only to the substation which is assigned to the feeder section having said data receiving means receiving the data from the train.

9. An apparatus for controlling movement of a train along a railway system, the railway system being formed by a plurality of feeder sections and a plurality of substations being spaced along the railway system, each of said plurality of substations being assignable one of said plurality of feeder sections, and each of said plurality of substations, when activated, supplying power to the assigned feeder section for controlling operation of a train running along the assigned feeder section, said apparatus comprising:

route determining means for determining a route to be taken by the train;

assigning means for assigning a said feeder section, along the determined route, to a said substation whereby said assigned feeder section and said substation are electrically controllable;

substation locking means for locking said assigned feeder section to said substation such that cancellation of the assignment of said assigned feeder section to said substation is prohibited until predetermined conditions occur;

direction designation means for designating a moving direction of the train along said assigned feeder section locked to said substation;

operational control means for controlling operation of the train according to a control route, said control route being determined from said assigned feeder section locked to said substation and from information concerning the moving direction of the train;

wherein said route determining means further comprises:
route examining means for determining whether the determined route of said route determining means will result in an alteration of the control route and whether the alteration of the control route is prohibited by predetermined rules; and route change prohibiting means for prohibiting the alteration of the control route when said route examining means determines that the alteration of the control route is prohibited by the predetermined rules.

10. The apparatus according to claim 9, wherein said examining means in response to at least one of the following:

(i) a train in the control route to be altered is currently under an instruction to perform an emergency halt; and (ii) the control route alteration would assign a substation a feeder section that is uncontrollable by said substation;

prohibits alteration of the control route.

11. An apparatus for controlling movement of a train along a railway system, the railway system being formed by a plurality of feeder sections and a plurality of substations being spaced along the railway system, each of said plurality of substations being assignable one of said plurality of feeder sections, and each of said plurality of substations, when activated, supplying power to the assigned feeder section for controlling operation of a train running along the assigned feeder section, said apparatus comprising:

route determining means for determining a route to be taken by the train;

assigning means for assigning a said feeder section, along the determined route, to a said substation whereby said assigned feeder section and said substation are electrically controllable;

substation locking means for locking said assigned feeder section to said substation such that cancellation of the assignment of said assigned feeder section to said substation is prohibited until predetermined conditions occur;

direction designation means for designating a moving direction of the train along said assigned feeder section locked to said substation;

operational control means for controlling operation of the train according to a control route, said control route being determined from said assigned feeder section locked to said substation and from information concerning the moving direction of the train;

wherein each said feeder section is defined by borders and said apparatus further comprises:

border changing means for changing the borders between adjacent feeder sections;

border checking means for determining whether the change of a border between adjacent feeder sections, to be effected by said border changing means, is prohibited by predetermined rules; and border change prohibiting means for prohibiting said border changing means from changing the border when said border checking means determines that the change of a border is prohibited by the predetermined rules.

12. The apparatus according to claim 11, wherein said border checking means in response to at least one of the following:

(i) the border change would result in a feeder section with a length of zero or a negative valve;

(ii) the border change would result in a new border containing a malfunctioning switching device unable to form a new border;

(iii) the border change would define a new feeder section containing a malfunctioning switching device therein which is unable to define said new feeder section; and (iv) the border change would adversely effect safe operation of the train; prohibits a border change.

13. A method for controlling movement of a train along a railway system in which a plurality of feeder sections form the railway system and a plurality of substations are spaced along the railway system, each of said plurality of substations is assignable to one of said plurality of feeder sections, and each of said plurality of substations, when activated, supplies power to the assigned feeder section for controlling operation of a train running along the assigned feeder section, said method comprising the steps of:

determining a route to be taken by the train with route determining means;

assigning a said feeder section, along the determined route, to a said substation with assigning means whereby said assigned feeder section and said substation are electrically controllable;

locking said assigned feeder section to said substation with substation locking means such that cancellation of the assignment of said assigned feeder section to said substation is prohibited until predetermined conditions occur;

designating a moving direction of the train, along said assigned feeder section locked to said substation, with direction designation means;

controlling operation of the train, according to a control route, with operational control means;

determining said control route from a said assigned feeder section locked to said substation and from information concerning the moving direction of the train;

linking and locking a plurality of serially arranged individual control routes with one another, with linkage locking means, to form an enlarged control route;

causing all of said substations along the linked and locked enlarged control route to cooperate with one another for controlling operation of the train;

determining whether a train leaves any one of said feeder sections, included within said enlarged control route, with passage determination means;

automatically unlocking each said feeder section locked by said linkage locking means, with automatic linkage unlocking means, when said passage determination means determines that the train left that feeder section;

automatically unlocking the substation, locked to the unlocked feeder section, with automatic substation unlocking means only after said automatic linkage unlocking means automatically unlocks the feeder section; and canceling the assignment of the substation, for the feeder section which was unlocked from the substation, with assignment cancellation means provided within said assigning means.

14. The method according to claim 13, further comprising the steps of:

receiving data from the train traveling along the railway via a plurality of data receiving means provided along the railway; and selectively communicating the received data, with selective communication means, as the data to be utilized in controlling operation of the train only to the substation which is assigned to the feeder section having said data receiving means receiving the data from the train.

15. A method for controlling movement of a train along a railway system in which a plurality of feeder sections form the railway system and a plurality of substations are spaced along the railway system, each of said plurality of substations is assignable to one of said plurality of feeder sections, and each of said plurality of substations, when activated, supplies power to the assigned feeder section for controlling operation of a train running along the assigned feeder section, said method comprising the steps of:

determining a route to be taken by the train with route determining means;

assigning a said feeder section, along the determined route, to a said substation with assigning means whereby said assigned feeder section and said substation are electrically controllable;

locking said assigned feeder section to said substation with substation locking means such that cancellation of the assignment of said assigned feeder section to said substation is prohibited until predetermined conditions occur;

designating a moving direction of the train, along said assigned feeder section locked to said substation, with direction designation means;

controlling operation of the train, according to a control route, with operational control means;

determining said control route from a said assigned feeder section locked to said substation and from information concerning the moving direction of the train;

determining, with route examining means, whether the determined route of said route determining means will result in an alteration of the control route and whether the alteration of the control route is prohibited by predetermined rules; and prohibiting the alteration of the control route, with route change prohibiting means, when said route examining means determines that the alteration of the control route is prohibited by the predetermined rules.

16. The method according to claim 15, further comprising the step of prohibiting alteration of the control route when at least one of:

(i) a train in the control route to be altered is currently under an instruction to perform an emergency halt; and (ii) the control route alteration would assign a substation a feeder section that is uncontrollable by said substation.

17. A method for controlling movement of a train along a railway system in which a plurality of feeder sections form the railway system and a plurality of substations are spaced along the railway system, each of said plurality of substations is assignable to one of said plurality of feeder sections, and each of said plurality of substations, when activated, supplies power to the assigned feeder section for controlling operation of a train running along the assigned feeder section, said method comprising the steps of:

determining a route to be taken by the train with route determining means;

assigning a said feeder section, along the determined route, to a said substation with assigning means whereby said assigned feeder section and said substation are electrically controllable;

locking said assigned feeder section to said substation with substation locking means such that cancellation of the assignment of said assigned feeder section to said substation is prohibited until predetermined conditions occur;

designating a moving direction of the train, along said assigned feeder section locked to said substation, with direction designation means;

controlling operation of the train, according to a control route, with operational control means;

determining said control route from a said assigned feeder section locked to said substation and from information concerning the moving direction of the train;

defining each said feeder section with borders;

allowing the change of borders, between adjacent feeder sections, with border changing means;

determining, with border checking means, whether the change of a border between adjacent feeder sections, to be effected by said border changing means, is prohibited by predetermined rules; and prohibiting, with border change prohibiting means, said border changing means from changing the border when said border checking means determines that the change of border is prohibited by the predetermined rules.

18. The method according to claim 17, further comprising the step of prohibiting the change of a border when at least one of the following is present:

(i) the border change would result in a feeder section with a length of zero or a negative valve;

(ii) the border change would result in a new border containing a malfunctioning switching device unable to form a new border;

(iii) the border change would define a new feeder section containing a malfunctioning switching device therein which is unable to define said new feeder section; and (iv) the border change would adversely effect safe operation of the train.

19. The method according to claim 17, further comprising the step of prohibiting a border change when (1) the border change concerns curtailing a feeder section, (2) there is another train in the feeder section to be curtailed, and (3) curtailment of the feeder section would result in at least one of:

(i) placing the train in the feeder section to be curtailed outside of the curtailed section; and (ii) placing a new border which is ahead of the train in the feeder section to be curtailed but within a safe braking distance of the train in the feeder section to be curtailed.

20. The method according to claim 17, further comprising the step of prohibiting a border change when (1) the border change concerns elongating a feeder section, (2) there is another train in the feeder section to be elongated, (3) a feeder section ahead of the feeder section to be elongated contains another train running in the opposite direction than the train in the feeder section to be elongated, and (4) the border change would result in at least one of:

(i) placing the train running in the opposite direction in the elongated feeder section; and (ii) placing a new border within a safe braking distance of the train running in the opposite direction.

21. The method according to claim 17, further comprising the step of prohibiting a border change when (1) the border change concerns elongating a feeder section, (2) there is another train in the feeder section to be elongated, (3) a feeder section ahead of the feeder section to be elongated contains a train running in the same direction as the train in the feeder section to be elongated, and (4) the border change would result in at least one of:

(i) placing the train running in the same direction in the elongated feeder section; and (ii) elimination of a switching device, ahead of the train in the feeder section to be elongated, that could be activated to form the new border.

* * * * *